United States Patent
Yu et al.

(10) Patent No.: US 12,526,137 B2
(45) Date of Patent: Jan. 13, 2026

(54) METHOD FOR SAVING CIPHERTEXT AND APPARATUS

(71) Applicant: Honor Device Co., Ltd., Shenzhen (CN)

(72) Inventors: Hongjian Yu, Shenzhen (CN); Shuang Li, Shenzhen (CN); Fei Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 301 days.

(21) Appl. No.: 18/003,265

(22) PCT Filed: May 11, 2022

(86) PCT No.: PCT/CN2022/092296
§ 371 (c)(1),
(2) Date: Dec. 23, 2022

(87) PCT Pub. No.: WO2022/247639
PCT Pub. Date: Dec. 1, 2022

(65) Prior Publication Data
US 2023/0254143 A1   Aug. 10, 2023

(30) Foreign Application Priority Data
May 24, 2021 (CN) .......................... 202110566480.8

(51) Int. Cl.
*H04L 9/14* (2006.01)
*G06F 21/79* (2013.01)

(52) U.S. Cl.
CPC ................ *H04L 9/14* (2013.01); *G06F 21/79* (2013.01)

(58) Field of Classification Search
CPC ....... H04L 9/14; G06F 21/79; G06F 21/6209; G06F 21/78; G06F 21/602
See application file for complete search history.

(56) References Cited

U.S. PATENT DOCUMENTS

| 7,729,690 B1 | 6/2010 | Huang et al. |
| 8,239,679 B2 | 8/2012 | Shan |

(Continued)

FOREIGN PATENT DOCUMENTS

| CN | 101075874 A | 11/2007 |
| CN | 201518127 U | 6/2010 |

(Continued)

OTHER PUBLICATIONS

Istorage Limited, "Non-Proprietary Security Policy," Datashur; Secure USB Flash Drive; datAshur Pro 3.0; FIPS 140-2 Security Policy Version 1.2; Jul. 14, 2017; 14 pages, XP093012314; Retrieved from the internet, URL:https://csrc.nist.gov/csrc/media/projects/cryptographic-module-validation-program/documents/security-policies/140sp2688.pdf.

*Primary Examiner* — Taghi T Arani
*Assistant Examiner* — Blake I Narramore
(74) *Attorney, Agent, or Firm* — Slater Matsil, LLP

(57) ABSTRACT

This application provides a method for saving a ciphertext and an apparatus. The method includes: obtaining an encryption instruction, where the encryption instruction instructs to encrypt a file in an external memory; obtaining an eigenvalue of a first account identifier based on the encryption instruction; encrypting a first key by using the eigenvalue of the first account identifier to generate a first ciphertext, where the first key is used to encrypt a second key, and the second key is used to encrypt a first file in the external memory; encrypting the eigenvalue of the first account identifier to generate a second ciphertext; and storing the first ciphertext and the second ciphertext in a non-erasable partition.

20 Claims, 19 Drawing Sheets

(56) References Cited

U.S. PATENT DOCUMENTS

| | | | |
|---|---|---|---|
| 10,164,955 B1 | 12/2018 | Michael et al. | |
| 2012/0185759 A1 | 7/2012 | Helen et al. | |
| 2014/0373184 A1* | 12/2014 | Mahaffey | G06F 21/88 726/35 |
| 2017/0337390 A1* | 11/2017 | Hamilton | H04L 9/0861 |
| 2018/0046805 A1 | 2/2018 | Le Roy et al. | |
| 2018/0091301 A1 | 3/2018 | David et al. | |
| 2018/0324162 A1* | 11/2018 | Teshome | H04L 63/08 |
| 2019/0244186 A1* | 8/2019 | Guo | G06Q 20/4016 |
| 2020/0151356 A1 | 5/2020 | Kurt | |
| 2020/0285775 A1* | 9/2020 | Zankharia | G06F 21/6281 |
| 2021/0224393 A1* | 7/2021 | Ko | G06F 21/575 |
| 2021/0325948 A1* | 10/2021 | Lee | G06F 3/0644 |
| 2022/0147641 A1* | 5/2022 | Fang | G06F 21/606 |
| 2022/0156391 A1* | 5/2022 | Fang | G06F 21/606 |

FOREIGN PATENT DOCUMENTS

| | | |
|---|---|---|
| CN | 105809045 A | 7/2016 |
| CN | 111614698 A | 9/2020 |
| CN | 111966373 A | 11/2020 |
| CN | 112262548 A | 1/2021 |
| CN | 112560058 A | 3/2021 |
| CN | 112632593 A | 4/2021 |
| CN | 113408016 A | 9/2021 |

\* cited by examiner

METHOD FOR SAVING CIPHERTEXT AND APPARATUS

CROSS-REFERENCE TO RELATED APPLICATIONS

This application is a national stage of International Application No. PCT/CN2022/092296, filed on May 11, 2022, which claims priority to Chinese Patent Application No. 202110566480.8, filed on May 24, 2021. The disclosures of both of the aforementioned application are hereby incorporated by reference in their entireties.

TECHNICAL FIELD

This application relates to the field of terminals, and in particular, to a method for saving a ciphertext and an apparatus.

BACKGROUND

With emergence of services with a large data volume, such as enhanced mobile broadband (enhanced mobile broadband, eMBB) and high-definition video, an electronic device faces a problem of insufficient storage space. An external memory (such as a secure digital (secure digital, SD) card) connected to the electronic device can resolve the problem of insufficient storage space. To ensure data security, data in the external memory needs to be encrypted and stored.

A key of the external memory is encrypted by using a lock screen password and then stored in an erasable partition of the electronic device. When a user implements a factory reset (factory reset) on the electronic device, the encrypted key (namely, a ciphertext) in the erasable partition is deleted before being saved, and consequently, the data in the external memory cannot be decrypted.

SUMMARY

This application provides a method for saving a ciphertext and an apparatus, so as to resolve a problem that data in an external memory cannot be decrypted after an electronic device performs a factory reset.

According to a first aspect, a method for saving a ciphertext is provided, including: obtaining an encryption instruction, where the encryption instruction instructs to encrypt a file in an external memory; obtaining an eigenvalue of a first account identifier based on the encryption instruction; encrypting a first key by using the eigenvalue of the first account identifier to generate a first ciphertext, where the first key is used to encrypt a second key, and the second key is used to encrypt a first file in the external memory; encrypting the eigenvalue of the first account identifier to generate a second ciphertext; and storing the first ciphertext and the second ciphertext in a non-erasable partition.

The encryption instruction is an instruction that is triggered when a user encrypts the external memory on an encryption setting interface. After obtaining the encryption instruction, the electronic device generates the first ciphertext and the second ciphertext, and stores the first ciphertext and the second ciphertext in a non-erasable partition of the electronic device. In this way, before the user implements a factory reset on the electronic device, the electronic device has completed the secure storage of the first ciphertext and the second ciphertext. After completing the factory reset, the electronic device may restore the first key from the non-erasable partition, and then decrypt the second key in the external memory by using the first key, and decrypt the file in the external memory by using the second key, thereby resolving a problem that the file in the external memory cannot be decrypted after the factory reset.

Optionally, the method further includes: obtaining indication information for switching an account; verifying the first account identifier based on the indication information; obtaining an eigenvalue of a second account identifier after the first account identifier is verified; and updating the first ciphertext and the second ciphertext based on the eigenvalue of the second account identifier.

The user may switch a currently logged-in account identifier (for example, the first account identifier) on an account login interface. After the user triggers the electronic device to generate the instruction information for switching the account on the account login interface, the electronic device may require the user to input a password corresponding to the first account identifier to verify the first account identifier. After the first account identifier is verified, it indicates that the user who switches the account identifier is a valid user. The electronic device may obtain the second account identifier that is input by the user, calculate a hash value (an example of an eigenvalue) of the second account identifier, and then update the first ciphertext and the second ciphertext by using the hash value of the second account identifier. The electronic device may first decrypt the first key, then generate an updated first ciphertext by using the hash value of the second account identifier, and then generate an updated second ciphertext by encrypting the hash value of the second account identifier. In the foregoing solution, after determining that the current user (the user who switches the account identifier) is a valid user, the first ciphertext and the second ciphertext are updated by using the account identifier (the second account identifier) of the current user, and rights of encrypting and decrypting the external memory corresponding to the first account identifier are relieved, thereby ensuring the security of data in the external memory.

Optionally, the method further includes: verifying the first account identifier after a factory reset is completed; and when the first account identifier is verified successfully, decrypting the first ciphertext and the second ciphertext to generate the first key.

After the electronic device performs the factory reset, an account verification mechanism is activated. The mechanism requires that the electronic device can be normally used only after the account is verified successfully. A last logged-in account identifier (for example, the first account identifier) that is verified before the factory reset, and this may ensure that the user of the electronic device after performing the factory reset is a valid user, so as to ensure the security of data in the external memory.

Optionally, the verifying the first account identifier includes:

verifying the first account identifier when a factory reset protection (factory reset protection, FRP) state has been triggered.

Optionally, the method further includes: encrypting the first key by using an empty auth to generate a third ciphertext; encrypting the empty auth to generate a fourth ciphertext; and storing the third ciphertext and the fourth ciphertext in the non-erasable partition.

Because the user may switch the account, there is a risk of leakage if the electronic device continues to use, after performing the factory reset, the first account identifier or the second account identifier to encrypt and save the first key. After decrypting the first key, the electronic device may use the empty auth to encrypt and save the first key, thereby ensuring the security of data in the external memory.

Optionally, the method further includes: copying the third ciphertext and the fourth ciphertext from the non-erasable partition to an erasable partition; generating the first key based on the third ciphertext and the fourth ciphertext in the erasable partition; and decrypting, based on the first key, the first file that is encrypted in the external memory.

Optionally, before the verifying the first account identifier, the method further includes: obtaining a factory reset instruction that is triggered by a recovery interface; and formatting data in the erasable partition based on the factory reset instruction.

Optionally, the encrypting a first key by using the eigenvalue of the first account identifier includes: invoking a key management module keymaster TA to encrypt the first key by using the eigenvalue of the first account identifier. The encrypting the eigenvalue of the first account identifier includes: invoking the keymaster TA to encrypt the eigenvalue of the first account identifier.

Optionally, the storing the first ciphertext and the second ciphertext in a non-erasable partition includes: invoking a trusted execution environment application programming interface to store the first ciphertext and the second ciphertext in the non-erasable partition.

Optionally, the first key is further used to encrypt a third key, and the third key is used to encrypt a second file that is encrypted in the external memory.

Optionally, the method further includes: obtaining an eigenvalue of a lock screen password based on the encryption instruction; encrypting the first key by using the eigenvalue of the lock screen password to generate a fifth ciphertext; encrypting the eigenvalue of the lock screen password to generate a sixth ciphertext; and storing the fifth ciphertext and the sixth ciphertext in the erasable partition.

Optionally, the encrypting the first key by using the eigenvalue of the lock screen password includes: invoking the keymaster TA to encrypt the first key by using the eigenvalue of the lock screen password. The encrypting the eigenvalue of the lock screen password includes: invoking the keymaster TA to encrypt the eigenvalue of the lock screen password.

Optionally, the method further includes: obtaining a user reset instruction that is triggered by a setting interface; and backing up the fifth ciphertext and the sixth ciphertext to the non-erasable partition based on the user reset instruction.

Optionally, the backing up the fifth ciphertext and the sixth ciphertext to the non-erasable partition based on the user reset instruction includes: decrypting the first key from the fifth ciphertext and the sixth ciphertext based on the user reset instruction; encrypting the first key by using an empty auth to generate a seventh ciphertext; encrypting the empty auth to generate an eighth ciphertext; and storing the seventh ciphertext and the eighth ciphertext in the non-erasable partition.

Optionally, the method further includes: copying the seventh ciphertext and the eighth ciphertext from the non-erasable partition to the erasable partition after a user reset is completed; decrypting the first key from the seventh ciphertext and the eighth ciphertext in the erasable partition; and decrypting, based on the first key, the first file that is encrypted in the external memory.

Optionally, the erasable partition is a data partition, and the eigenvalue of the lock screen password is a hash value of the lock screen password.

Optionally, the non-erasable partition is a sec_storage partition, and the eigenvalue of the first account identifier is a hash value of the first account identifier.

According to a second aspect, another method for saving a ciphertext is provided, including: displaying an encryption setting interface of an external memory; receiving a first operation that is performed by a user on the encryption setting interface; encrypting a file in the external memory in response to the first operation; receiving a second operation of the user; displaying a factory reset setting interface in response to the second operation; receiving a third operation that is performed by the user on the factory reset setting interface; performing a factory reset in response to the third operation; displaying an account verification interface; receiving verification information that is input by the user on the account verification interface; and when the verification information is verified, and when an operation in which the user accesses the file in the external memory is received, decrypting the file that is encrypted in the external memory.

The encryption instruction is an instruction that is triggered when a user encrypts the external memory on an encryption setting interface. After obtaining the encryption instruction, the electronic device generates the first ciphertext and the second ciphertext, and stores the first ciphertext and the second ciphertext in a non-erasable partition of the electronic device. In this way, before the user implements a factory reset on the electronic device, the electronic device has completed the secure storage of the first ciphertext and the second ciphertext. After completing the factory reset, the electronic device may restore the first key from the non-erasable partition, and then decrypt the second key in the external memory by using the first key, and decrypt the file in the external memory by using the second key, thereby resolving a problem that the file in the external memory cannot be decrypted after the factory reset.

According to a third aspect, an apparatus for saving a ciphertext is provided, including a unit that is configured to perform the method according to any one of the first aspect or the second aspect. The apparatus may be a terminal device, or may be a chip in a terminal device. The apparatus may include an input unit and a processing unit.

When the apparatus is a terminal device, the processing unit may be a processor, and the input unit may be a communication interface. The terminal device may further include a memory, and the memory is configured to store a computer program code. When the processor executes the computer program code of the memory, the terminal device is enabled to perform the method according to any one of the first aspect or the second aspect.

When the apparatus is a chip in a terminal device, the processing unit may be the processing unit inside the chip, and the input unit may be an output interface, a pin, a circuit, or the like. The chip may further include a memory. The memory may be a memory (for example, a register or a cache) in the chip, or may be a memory (for example, a read-only memory or a random access memory) that is located outside the chip. The memory is configured to store the computer program code. When the processor executes the computer program code that is stored in the memory, the chip is enabled to perform any one of the first aspect or the second aspect.

According to a fourth aspect, a computer-readable storage medium is provided. The computer-readable storage medium stores a computer program code. When the computer program code is run on an apparatus for saving a ciphertext, the apparatus is enabled to perform the method according to any one of the first aspect or the second aspect.

According to a fifth aspect, a computer program product is provided. The computer program product includes a computer program code. When the computer program code is run on an apparatus for saving a ciphertext, the apparatus is enabled to perform the method according to any one of the first aspect or the second aspect.

DETAILED DESCRIPTION OF ILLUSTRATIVE EMBODIMENTS

The following describes technical solutions in embodiments of this application with reference to accompanying drawings.

Figure 1:
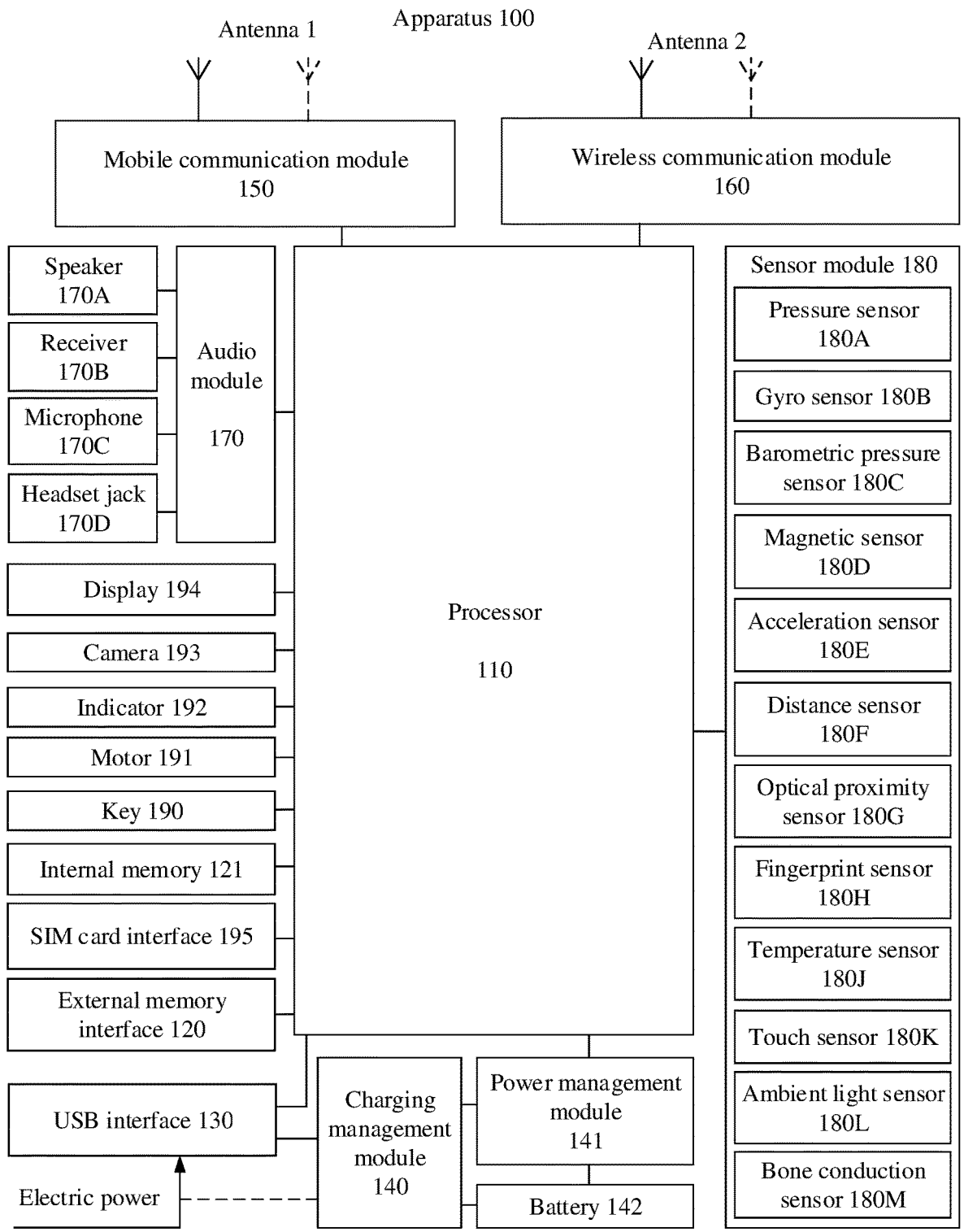
FIG. 1 is a schematic diagram of a hardware system that is applicable to an apparatus according to this application.

FIG. 1 shows a hardware system that is applicable to the apparatus according to this application.

An apparatus 100 may be a mobile phone, a smart screen, a tablet computer, a wearable electronic device, an in-vehicle electronic device, an augmented reality (augmented reality, AR) device, a virtual reality (virtual reality, VR) device, a laptop computer, an ultra-mobile personal computer (ultra-mobile personal computer, UMPC), a netbook, a personal digital assistant (personal digital assistant, PDA), a projector, or the like. A specific type of the apparatus 100 is not limited in this embodiment of this application.

The apparatus 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, and a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that a structure shown in FIG. 1 does not constitute a specific limitation on the apparatus 100. In some other embodiments of this application, the apparatus 100 may include more or fewer components than the components shown in FIG. 1, or the apparatus 100 may include a combination of some of the components shown in FIG. 1, or the apparatus 100 may include subcomponents of some of the components shown in FIG. 1. The components shown in FIG. 1 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent device, or may be integrated devices.

The controller may generate an operation control signal based on an instruction operation code and a timing signal, to complete control of instruction fetch and instruction execution.

The processor 110 may further be provided with a memory for storing instructions and data. In some embodiments, the memory in the processor 110 is a cache. The memory may store instructions or data just used or cyclically used by the processor 110. If the processor no needs to use the instructions or the data again, the instructions or the data may be directly invoked from the memory. Repeated access is avoided, and a waiting time of the processor 110 is reduced, thereby improving system efficiency.

In some embodiments, the processor 110 may include one or more interfaces. For example, the processor 110 may include at least one of the following interfaces: an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, and a USB interface.

The I2C interface is a bidirectional synchronous serial bus, including a serial data line (serial data line, SDA) and a serial clock line (serial clock line, SCL). In some embodiments, the processor 110 may include a plurality of groups of I2C buses. The processor 110 may be coupled to the touch sensor 180K, a charger, a flash, the camera 193 and the like by using different I2C bus interfaces. For example, the processor 110 may be coupled to the touch sensor 180K by using an I2C interface, so that the processor 110 communicates with the touch sensor 180K by using an I2C bus interface, to implement a touch function of the apparatus 100.

The I2S interface may be configured to perform audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the wireless communication module 160 by using the I2S interface, to implement a function of answering a call by using a Bluetooth headset.

The PCM interface may also be configured to perform audio communication to sample, quantize, and encode analog signals. In some embodiments, the audio module 170 may be coupled to the wireless communication module 160 by using the PCM interface. In some embodiments, the audio module 170 may also transmit an audio signal to the wireless communication module 160 by using the PCM interface, to implement a function of answering a call by using a Bluetooth headset. Both the I2S interface and the PCM interface may be configured to perform audio communication.

The UART interface is a universal serial data bus used for asynchronous communication. The bus may be a bidirectional communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 by using the UART interface, to implement a Bluetooth function. In some embodiments, the audio module 170 may transmit an audio signal to the wireless communication module 160 by using the UART interface, to implement a function of playing music by using a Bluetooth headset.

The MIPI interface may be configured to connect the processor 110 to peripheral devices such as the display 194 and the camera 193. The MIPI interface includes a camera serial interface (camera serial interface, CSI), a display serial interface (display serial interface, DSI), and the like. In some embodiments, the processor 110 and the camera 193 communicate with each other by using the CSI interface, to implement a shooting function of the apparatus 100. The processor 110 and the display 194 communicate with each other by using the DSI interface, to implement a display function of the apparatus 100.

The GPIO interface may be configured by using software. The GPIO interface may be configured as a control signal interface, or may be configured as a data signal interface. In some embodiments, the GPIO interface may be configured to connect the processor 110 to the camera 193, the display 194, the wireless communication module 160, the audio module 170, and the sensor module 180. The GPIO interface may alternatively be configured as the I2C interface, the I2S interface, the UART interface, or the MIPI interface.

The USB interface 130 is an interface that conforms to a USB standard specification, for example, may be a mini (Mini) USB interface, a micro (Micro) USB interface, or a USB Type C (USB Type C) interface. The USB interface 130 may be configured to connect to the charger to charge the apparatus 100, may be configured to transmit data between the apparatus 100 and a peripheral device, or may be configured to connect to the headset to play audio by using the headset. The USB interface 130 may be further configured to connect to another apparatus 100, such as an AR device.

The connection relationship between the modules shown in FIG. 1 is merely an example for description, and does not constitute a limitation on the connection relationship between the modules of the apparatus 100. Optionally, the modules of the apparatus 100 may alternatively use a combination of a plurality of connection manners in the foregoing embodiment.

The charging management module 140 is configured to receive electric power from the charger. The charger may be a wireless charger, or may be a wired charger. In some embodiments of wired charging, the charging management module 140 may receive a current of the wired charger by using the USB interface 130. In some embodiments of wireless charging, the charging management module 140 may receive an electromagnetic wave (the current path is shown by the dashed line) by using a wireless charging coil of the apparatus 100. In addition to charging the battery 142, the charging management module 140 may further supply power to the apparatus 100 by using the power management module 141.

The power management module 141 is configured to connect the battery 142, the charging management module 140, and the processor 110. The power management module 141 receives an input from the battery 142 and/or an input from the charging management module 140, and supplies power to the processor 110, the internal memory 121, the display 194, the camera 193, the wireless communication module 160, and the like. The power management module 141 may be further configured to monitor parameters such as a battery capacity, a battery cycle quantity, and a battery health state (for example, leakage or impedance). Optionally, the power management module 141 may be disposed in the processor 110, or the power management module 141 and the charging management module 140 may be disposed in a same device.

A wireless communication function of the apparatus 100 may be implemented by using devices such as the antenna 1, the antenna 2, the mobile communication module 150, the wireless communication module 160, the modem processor, and the baseband processor.

The antenna 1 and the antenna 2 are configured to transmit and receive electromagnetic wave signals. Each antenna in the apparatus 100 may be configured to cover one or more communication frequency bands. Different antennas may also be multiplexed to improve antenna utilization. For example, the antenna 1 may be multiplexed into a diversity antenna of a wireless local area network. In some other embodiments, the antenna may be used in combination with a tuning switch.

The mobile communication module 150 can provide a solution that is applied to the wireless communication on the apparatus 100, for example, at least one of the following solutions: a second generation ($2^{nd}$ generation, 2G) mobile communication solution, a third generation ($3^{rd}$ generation 3G) mobile communication solution, a fourth generation ($4^{th}$ generation, 4G) mobile communication solution, and a 5th generation ($5^{th}$ generation, 5G) mobile communication solution. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and then transmit the electromagnetic wave to the modem processor for demodulation. The mobile communication module 150 may further amplify a signal that is modulated by the modem processor, and convert the signal into an electromagnetic wave for radiation by using the antenna 1. In some embodiments, at least some function modules of the mobile communication module 150 may be disposed in the processor 110. In some embodiments, at least some function modules of the mobile communication module 150 may be disposed in a same device as at least some modules of the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal that is obtained through demodulation to the baseband processor for processing. The low-frequency baseband signal is processed by the baseband processor and then transmitted to the application processor. The application processor outputs a sound signal by using an audio device (for example, the speaker 170A, the receiver 170B), or displays an image or a video by using the display 194. In some embodiments, the modem processor may be an independent device. In some other embodiments, the modem processor may be independent of the processor 110, and is disposed in a same device as the mobile communication module 150 or another function module.

Similar to the mobile communication module 150, the wireless communication module 160 may also provide a wireless communication solution that is applied to the apparatus 100, for example, at least one of the following solutions: a wireless local area network (wireless local area networks, WLAN), Bluetooth (Bluetooth, BT), a Bluetooth low energy (Bluetooth low energy, BLE), an ultra-wideband (ultra wide band, UWB), a global navigation satellite system (global navigation satellite system, GNSS), frequency modulation (frequency modulation, FM), near field communication (near field communication, NFC), and an infrared (infrared, IR) technology. The wireless communication module 160 may be one or more devices integrating at least one communication processor module. The wireless communication module 160 receives an electromagnetic wave by using the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation by using the antenna 2.

In some embodiments, the antenna 1 of the apparatus 100 is coupled to the mobile communication module 150, and the antenna 2 of the apparatus 100 is coupled to the wireless communication module 160, so that the electronic device 100 can communicate with a network and another electronic device by using a wireless communication technology. The wireless communication technology may include at least one of the following communication technologies: a global system for mobile communications (global system for mobile communications, GSM), a general packet radio service (general packet radio service, GPRS), a code division multiple access (code division multiple access, CDMA), a wideband code division multiple access (wideband code division multiple access, WCDMA), a time-division code division multiple access (time-division code division multiple access, TD-SCDMA), long term evolution (long term evolution, LTE), BT, GNSS, WLAN, NFC, FM, an IR technology. The GNSS may include at least one of the following positioning technologies: a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and a satellite based augmentation systems (satellite based augmentation systems, SBAS).

The apparatus 100 can implement the display function by using the GPU, the display 194, and the application processor. The GPU is an image processing microprocessor, which is connected to the display 194 and the application processor. The GPU is configured to perform mathematical and geometric calculations to render graphics. The processor 110 may include one or more GPUs that execute program instructions to generate or change display information.

The display 194 may be configured to display an image or a video. The display 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini light-emitting diode (mini light-emitting diode, Mini LED), a micro light-emitting diode (micro light-emitting diode, Micro LED), a micro OLED (Micro OLED), or a quantum dot light-emitting diode (quantum dot light-emitting diodes, QLED). In some embodiments, the apparatus 100 may include one or N displays 194, where N is a positive integer greater than 1.

The apparatus 100 can implement a shooting function by using the ISP, the camera 193, the video codec, the GPU, the display 194, the application processor, and the like.

The ISP is configured to process data fed back by the camera 193. For example, during photographing, a shutter is pressed, light is transmitted to a light-sensitive element of the camera by using a lens, an optical signal is converted into an electrical signal, and the light-sensitive element of the camera transfers the electrical signal to the ISP for processing, so that the electrical signal is converted into an image visible to a naked eye. The ISP may perform algorithm optimization on a noise point, brightness, and a color of an image, and the ISP may further optimize parameters such as exposure and a color temperature of a shooting scenario. In some embodiments, the ISP may be disposed in the camera 193.

The camera 193 is configured to capture a still image or a video. An optical image is generated for an object by using the lens and is projected to the light-sensitive element. The light-sensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transfers the electrical signal to the ISP. The ISP converts the electrical signal into a digital image signal. The ISP outputs the digital image signal to the DSP for processing. The DSP converts the digital image signal into a standard image signal in a format such as red green blue (red green blue, RGB) or YUV. In some embodiments, the apparatus 100 may include one or N cameras 193, where N is a positive integer greater than 1.

The digital signal processor is configured to process a digital signal. In addition to processing a digital image signal, the digital signal processor can further process another digital signal. For example, when the apparatus 100 selects a frequency, the digital signal processor is configured to perform Fourier transform, and the like on frequency energy.

The video codec is configured to compress or decompress a digital video. The apparatus 100 may support one or more types of video codecs. Therefore, the apparatus 100 may play or record videos in a plurality of encoding formats, such as moving picture experts group (moving picture experts group, MPEG) 1, MPEG 2, MPEG 3, and MPEG 4.

The NPU is a processor used by referring to a structure of a biological neural network. For example, the NPU quickly processes input information by referring to a transfer mode between human brain neurons, and may further continuously perform self-learning. Functions such as intelligent cognition of the apparatus 100 may be implemented by using the NPU, for example, image recognition, facial recognition, speech recognition, and text understanding.

The external memory interface 120 may be configured to connect to an external memory card, such as a secure digital (secure digital, SD) card, to extend a storage capability of the apparatus 100. The external memory card communicates with the processor 110 by using the external memory interface 120, to implement a data storage function. For example, files such as music or a video are stored in the external memory card.

The internal memory 121 may be configured to store computer executable program code, where the executable program code includes instructions. The internal memory 121 may include a program storage area and a data storage area. The program storage area may store an operating system, and an application required by at least one function (for example, a voice playing function or an image playing function). The data storage area may store data (such as audio data or a phone book) created during use of the apparatus 100. In addition, the internal memory 121 may include a high-speed random access memory, and may further include a non-volatile memory, such as at least one magnetic disk storage device, a flash memory device, or a universal flash storage (universal flash storage, UFS). The processor 110 performs various processing methods of the apparatus 100 by running the instructions stored in the internal memory 121 and/or the instructions stored in the memory disposed in the processor.

The apparatus 100 can implement an audio function such as music playing and recording by using the audio module 170, the speaker 170A, the receiver 170B, the microphone 170C, the headset jack 170D, and the application processor, and the like.

The audio module 170 is configured to convert digital audio information into an analog audio signal output, and may also be configured to convert analog audio input into a digital audio signal. The audio module 170 may be further configured to encode and decode audio signals. In some embodiments, the audio module 170 or some function modules of the audio module 170 may be disposed in the processor 110.

The speaker 170A is also referred to as a horn, and is configured to convert an audio electrical signal into a sound signal. The apparatus 100 may listen to music or listen to a hands-free call by using the speaker 170A.

The receiver 170B is also referred to as a handset, and is configured to convert an audio electrical signal into a sound signal. When the user answers a call or listens to audio information by using the apparatus 100, the receiver 170B may be placed near an ear to listen to a voice.

The microphone 170C is also referred to loudspeaker, and is configured to convert a sound signal into an electrical signal. When making a call or sending voice information, the user may make a sound near the microphone 170C to input a sound signal to the microphone 170C. At least one microphone 170C may be disposed in the apparatus 100. In some other embodiments, two microphones 170C may be disposed in the apparatus 100, to implement a noise reduction function. In some other embodiments, three, four, or more microphones 170C may alternatively be disposed in the apparatus 100, to implement functions such as sound source identification and directional recording. The processor 110 may process the electrical signal that is output by the microphone 170C. For example, the audio module 170 and the wireless communication module 160 may be coupled by using the PCM interface. After converting an ambient sound into an electrical signal (for example, a PCM signal), the microphone 170C transmits the electrical signal to the processor 110 by using the PCM interface. The processor 110 performs volume analysis and frequency analysis on the electrical signal to determine the volume and the frequency of the ambient sound.

The headset jack 170D is configured to connect to a wired headset. The headset jack 170D may be a USB interface 130, or may be a 3.5 mm open mobile apparatus 100 platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, or a capacitive pressure sensor. The capacitive pressure sensor may include at least two parallel plates with conductive materials. When a force acts on the pressure sensor 180A, a capacitance between the electrodes changes, and the apparatus 100 determines pressure strength based on a capacitance change. When a touch operation is performed on the display 194, the apparatus 100 detects the touch operation by using the pressure sensor 180A. The apparatus 100 may also calculate a touch position based on a detection signal of the pressure sensor 180A. In some embodiments, touch operations that are performed on a same touch position but have different touch operation intensities may correspond to different operation instructions. For example, when a touch operation whose touch operation strength is less than a first pressure threshold is performed on an SMS message application icon, an instruction for viewing an SMS message is executed; or when a touch operation whose touch operation strength is greater than or equal to the first pressure threshold is performed on the SMS message application icon, an instruction for creating a new SMS message is executed.

The gyro sensor 180B may be configured to determine a movement posture of the apparatus 100. In some embodiments, angular velocities of the apparatus 100 around three axes (namely, the x axis, the y axis, and the z axis) may be determined by using the gyro sensor 180B. The gyro sensor 180B may be configured to implement image stabilization during shooting. For example, when a shutter is pressed, the gyro sensor 180B detects a shake angle of the apparatus 100, and calculates, based on the angle, a distance that needs to be compensated by a lens module, so that the lens counteracts the shake of the apparatus 100 through a reverse movement, thereby implementing image stabilization. The gyro sensor 180B may be further used in scenarios such as navigation and somatosensory gaming.

The barometric pressure sensor 180C is configured to measure a barometric pressure. In some embodiments, the apparatus 100 calculates an altitude based on a barometric pressure value that is measured by the barometric pressure sensor 180C, to assist in positioning and navigation.

The magnetic sensor 180D includes a Hall sensor. The apparatus 100 may detect opening and closing of a flip holster by using the magnetic sensor 180D. In some embodiments, when the apparatus 100 is a flip phone, the apparatus 100 may detect opening and closing of a flip cover based on the magnetic sensor 180D. The apparatus 100 may set a feature such as automatic unlocking of the flip cover based on a detected opening/closing state of the holster or a detected opening/closing state of the flip cover.

The acceleration sensor 180E may detect magnitudes of accelerations of the apparatus 100 in all directions (generally, the x axis, the y axis, and the z axis). When the apparatus 100 is still, a magnitude and a direction of gravity may be detected. The acceleration sensor 180E may be further configured to identify a posture of the apparatus 100 as an input parameter of an application such as such as switching between a landscape screen and a portrait screen or a pedometer.

The distance sensor 180F is configured to measure a distance. The apparatus 100 may measure a distance by using infrared or laser. In some embodiments, for example, in a shooting scenario, the apparatus 100 may use the distance sensor 180F to measure a distance to implement fast focusing.

The optical proximity sensor 180G may include, for example, a light-emitting diode (light-emitting diode, LED) and an optical detector such as a photodiode. The LED may be an infrared LED. The apparatus 100 emits infrared light outward by using the LED. The apparatus 100 detects infrared reflected light from a nearby object by using the photodiode. When the reflected light is detected, the apparatus 100 may determine that there is an object nearby. When 110 reflected light is detected, the apparatus 100 may determine that there is 110 object nearby. The apparatus 100 may detect, by using the optical proximity sensor 180G, whether the user holds the hand-held apparatus 100 close to the ear, so as to automatically turn off the screen to save power. The optical proximity sensor 180G may also be used for automatic unlocking and automatic locking in a holster mode or a pocket mode.

The ambient light sensor 180L is configured to sense brightness of ambient light. The apparatus 100 may adaptively adjust brightness of the display 194 based on the sensed brightness of the ambient light. The ambient light sensor 180L can also be configured to automatically adjust white balance during photographing. The ambient light sensor 180L can further cooperate with the optical proximity sensor 180G to detect whether the apparatus 100 is in a pocket, to prevent accidental touch.

The fingerprint sensor 180H is configured to collect a fingerprint. The apparatus 100 may use a feature of the collected fingerprint to implement functions such as unlocking, accessing an application lock, photographing, and answering a call.

The temperature sensor 180J is configured to detect a temperature. In some embodiments, the apparatus 100 performs a temperature processing strategy based on a temperature that is detected by the temperature sensor 180J. For example, when the temperature reported by the temperature sensor 180J exceeds a threshold, the apparatus 100 performs performance reduction of the processor that is located near the temperature sensor 180J, to reduce power consumption and implement thermal protection. In some other embodiments, when the temperature is lower than another threshold, the apparatus 100 heats the battery 142 to avoid abnormal shutdown of the apparatus 100 due to a low temperature. In some other embodiments, when the temperature is lower than still another threshold, the apparatus 100 performs a step-up on an output voltage of the battery 142, to avoid abnormal shutdown due to a low temperature.

The touch sensor 180K is also referred to as a touch device. The touch sensor 180K may be disposed on the display 194. The touch sensor 180K and the display 194 constitute a touchscreen, and the touchscreen is also referred to as a touch-controlled screen. The touch sensor 180K is configured to detect a touch operation performed on or near the touch sensor 180K. The touch sensor 180K may transfer the detected touch operation to the application processor to determine a type of a touch event. A visual output that is related to the touch operation may be provided by using the display 194. In some other embodiments, the touch sensor 180K may also be disposed on a surface of the apparatus 100 in a position different from that of the display 194.

The bone conduction sensor 180M may obtain a vibration signal. In some embodiments, the bone conduction sensor 180M may obtain a vibration signal of a vibration bone of a human vocal-cord pall. The bone conduction sensor 180M may also contact a human pulse, to receive a blood pressure beating signal. In some embodiments, the bone conduction sensor 180M may alternatively be disposed in a headset to be combined into a bone conduction headset. The audio module 170 may obtain a speech signal through parsing based on the vibration signal that is obtained by the bone conduction sensor 180M from bone mass vibration by the voice part, to implement a speech function. The application processor can parse heart rate information based on the blood pressure and pulse signal obtained by the bone conduction sensor 180M, to implement a heart rate detection function.

The key 190 includes a power-on key and a volume key. The key 190 may be a mechanical key, or may be a touch key. The apparatus 100 may receive a key input signal, to implement a function that is related to a key input signal.

The motor 191 may generate a vibration. The motor 191 may be configured to provide an incoming call prompt, or may be configured to provide a touch feedback. The motor 191 may generate different vibration feedback effects for different touch operations performed on different applications. For touch operations performed on different areas of the display 194, the motor 191 may also generate different vibration feedback effects. Different application scenarios (for example, a time reminder, information receiving, an alarm clock, and a game) may correspond to different vibration feedback effects. A touch vibration feedback effect may further be customized.

The indicator 192 may be an indicator light, and may be configured to indicate a charging state and a power change, or may be configured to indicate a message, a missed call, and a notification.

The SIM card interface 195 is configured to connect to a SIM card. The SIM card may be inserted into the SIM card interface 195 to implement contact with the apparatus 100, or may be removed from the SIM card interface 195 to implement separation from the apparatus 100. The apparatus 100 may support one or N SIM card interfaces, where N is a positive integer greater than 1. A plurality of cards may be inserted into a same SIM card interface 195 at the same time. Types of the plurality of cards may be the same or different. The SIM card interface 195 may also be compatible with an external memory card. The apparatus 100 interacts with a network by using a SIM card, to implement functions such as calling and data communication. In some embodiments, the apparatus 100 uses an embedded-SIM (embedded-SIM, eSIM) card. The eSIM card may be embedded in the apparatus 100, and cannot be separated from the apparatus 100.

The foregoing has described in detail a hardware system of the apparatus 100. The following describes a software system of the apparatus 100. A software system may use a layered architecture, an event-driven architecture, a microkernel architecture, a microservice architecture, or a cloud architecture. In this embodiment of this application, the layered architecture is used as an example to describe the software system of the apparatus 100.

Figure 2:
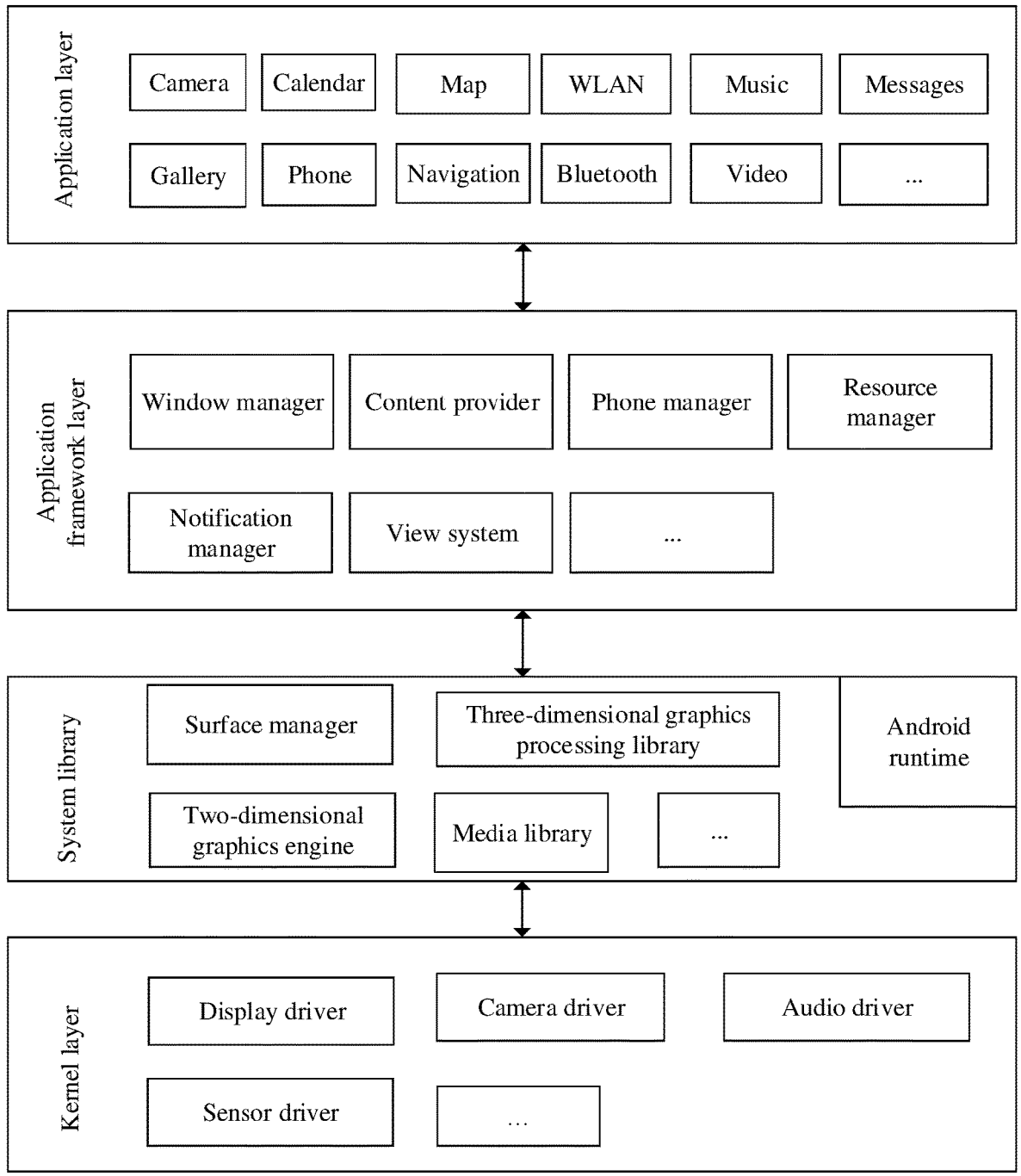
FIG. 2 is a schematic diagram of a software system that is applicable to an apparatus according to this application.

As shown in FIG. 2, a software system using a layered architecture is divided into several layers, and each layer has a clear role and task. The layers communicate with each other by using a software interface. In some embodiments, the software system may be divided into four layers: an application layer, an application framework layer, an Android runtime (Android Runtime) and system library, and a kernel layer from top to bottom.

The application layer may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer may include some predefined functions.

For example, the application framework layer includes a window manager, a content provider, a view system, a phone manager, a resource manager, and a notification manager.

The window manager is configured to manage a window program. The window manager may obtain a display size, determine whether there is a status bar, perform screen locking, take a screenshot, and the like.

The content provider is used to store and obtain data, and enables these data to be accessible to an application. The data may include a video, an image, audio, calls that are dialed and answered, a browsing history and a bookmark, and a phone book.

The view system includes visual controls, such as a control for displaying a text and a control for displaying a picture. The view system may be configured to construct an application. A display interface may include one or more views, for example, include a display interface of an SMS message notification icon, and may include a view for displaying a text and a view for displaying a picture.

The phone manager is configured to provide a communication function for the apparatus 100, for example, management of a call state (answering or declining).

The resource manager provides various resources for an application, such as a localized string, an icon, a picture, a layout file, and a video file.

The notification manager enables an application to display notification information in the status bar, which can be used to convey a notification-type message, and can automatically disappear after a short stay without user interaction. For example, the notification manager is configured to provide a notification of download completion and a message notification. The notification manager may also manage a notification that appears in a top status bar of the system in a form of a graph or scroll bar text, for example, a notification of an application running in the background. The notification manager may also manage a notification that appears on the display in a form of a dialog window. For example, text information is prompted in the status bar, a notification sound is produced, the electronic device vibrates, or the indicator light blinks.

The Android runtime includes a core library and a virtual machine. The Android runtime is responsible for scheduling and management of the Android system.

The core library includes two parts: one is a functional function that needs to be invoked by a java language, and the other is a core library of Android.

The application layer and the application framework layer run on a virtual machine. The virtual machine executes java files at the application layer and the application framework layer as binary files. The virtual machine is used to implement functions such as object lifecycle management, stack management, thread management, security and exception management, and recycling of waste.

The system library may include a plurality of function modules, for example, a surface manager (surface manager), a media library (Media Libraries), a three-dimensional graphics processing library (for example, open graphics library for embedded systems (open graphics library for embedded systems, OpenGL ES), and a 2D graphics engine (for example, a skia graphics library (skia graphics library, SGL)).

The surface manager is configured to: manage a display subsystem, and provide fusion of 2D layers and 3D layers for a plurality of applications.

The media library supports playback and recording of audio in a plurality of formats, playback and recording of videos in a plurality of formats, and still image files. The media library may support a plurality of audio and video coding formats, such as MPEG 4, H.264, moving picture experts group audio layer III (moving picture experts group audio layer III, MP3), advanced audio coding (advanced audio coding, AAC), adaptive multi-rate (adaptive multi-rate, AMR), joint photographic experts group (joint photographic experts group, JPG), and portable network graphics (portable network graphics, PNG).

The three-dimensional graphics processing library may be configured to implement three-dimensional graphics drawing, image rendering, compositing, and layer processing.

The two-dimensional graphics engine is a drawing engine for 2D drawing.

The kernel layer is a layer between hardware and software. The kernel layer may include drive modules such as a display driver, a camera driver, an audio driver, and a sensor driver.

The following describes an example of a working procedure of a software system and a hardware system of the apparatus 100 with reference to the display of a photographing scenario.

When the user performs a touch operation on the touch sensor 180K, a corresponding hardware interruption is sent to the kernel layer. The kernel layer processes the touch operation into a raw input event, and the raw input event includes information such as touch coordinates and a time stamp of the touch operation. The raw input event is stored at the kernel layer. The application framework layer obtains the raw input event from the kernel layer, identifies a control corresponding to the raw input event, and notifies an application (application, APP) corresponding to the control. For example, the touch operation is a tap operation, and an APP corresponding to the control is a camera APP. After the camera APP is awakened by the tap operation, the camera driver at the kernel layer may be invoked by using an API, and the camera driver controls the camera 193 to photograph.

The following uses the apparatus 100 as an example to describe a method for saving a ciphertext according to this application.

To ensure the security of files in an external memory, the files in the external memory may be encrypted and then stored in the external memory, and keys for decrypting the files are stored in an internal memory of the apparatus 100. In this way, content in the external memory can only be read in the apparatus 100 as a plaintext. When the external memory is connected to another electronic device, because 110 key is stored in the another electronic device, content in the external memory cannot be decrypted by the another electronic device, thereby ensuring the security of the files in the external memory.

The external memory may be an SD card, or may be a USB flash drive or another type of memory. The external memory may establish a data connection to the apparatus 100 in an inserted manner, or may establish a data connection to the apparatus 100 in a wired or wireless manner. A specific type of the external memory, and a connection manner of the external memory and the apparatus 100 are not limited in this application. The following uses an SD as an example for description.

Figure 3:
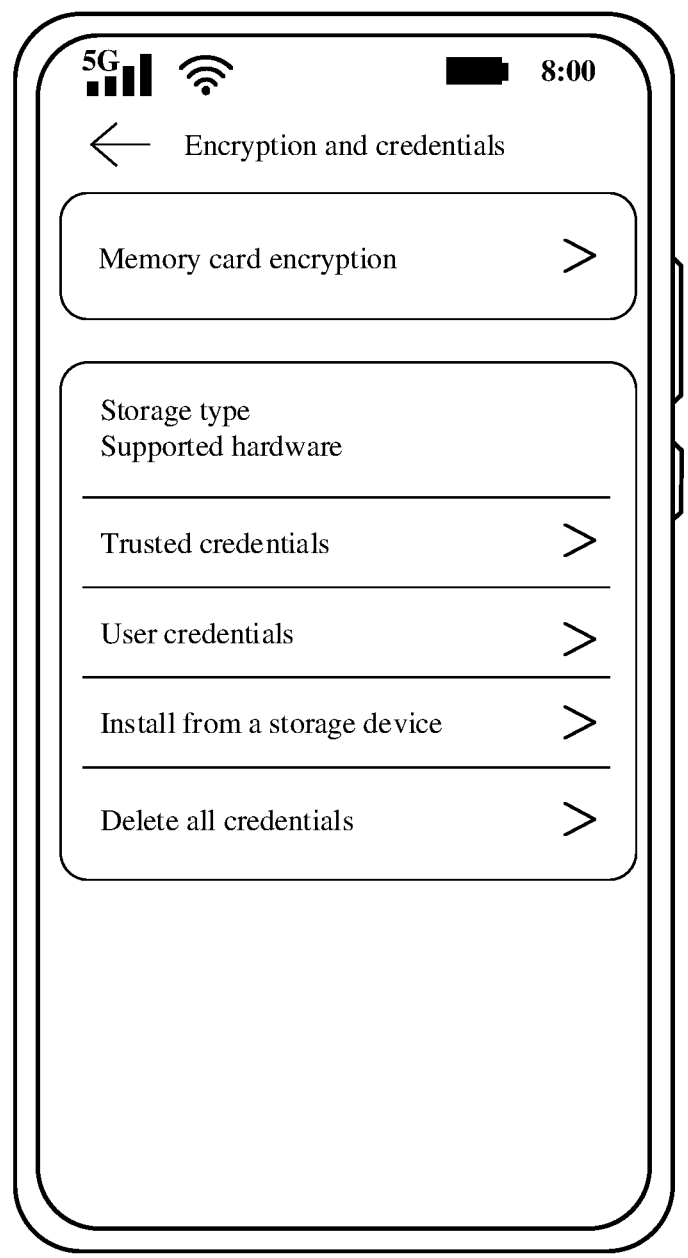
FIG. 3 is a schematic diagram of an encryption setting interface according to this application.
Figure 4:
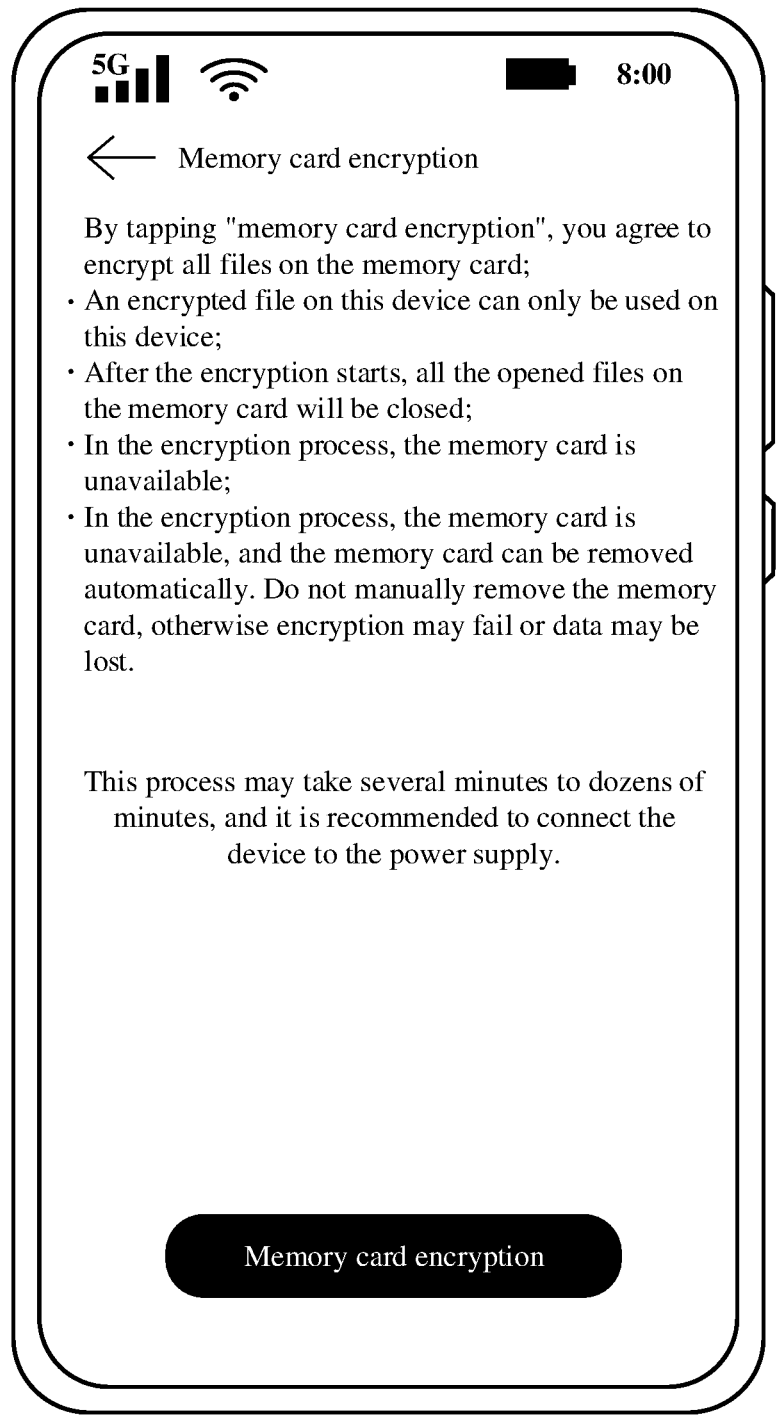
FIG. 4 is a schematic diagram of an encryption confirmation interface according to this application.
Figure 5:
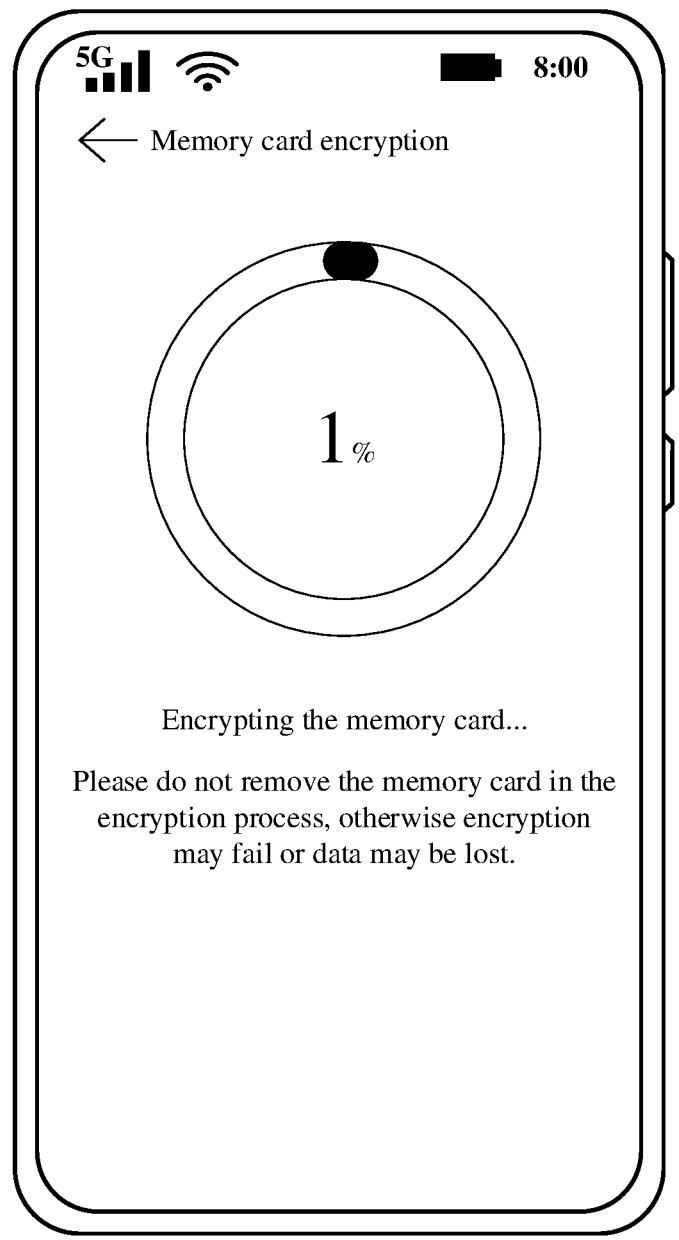
FIG. 5 is a schematic diagram of an encryption process interface according to this application.

A user may trigger an encryption process for an SD card on an encryption setting interface shown in FIG. 3. The user may tap "memory card encryption" in FIG. 3 to enter an encryption setting confirmation interface shown in FIG. 4. Subsequently, the user taps "memory card encryption" in FIG. 4 to confirm that a file in the SD card is encrypted. An interface of an encryption process is shown in FIG. 5. An encryption algorithm that is used in the encryption process is not limited in this application.

Figure 6:
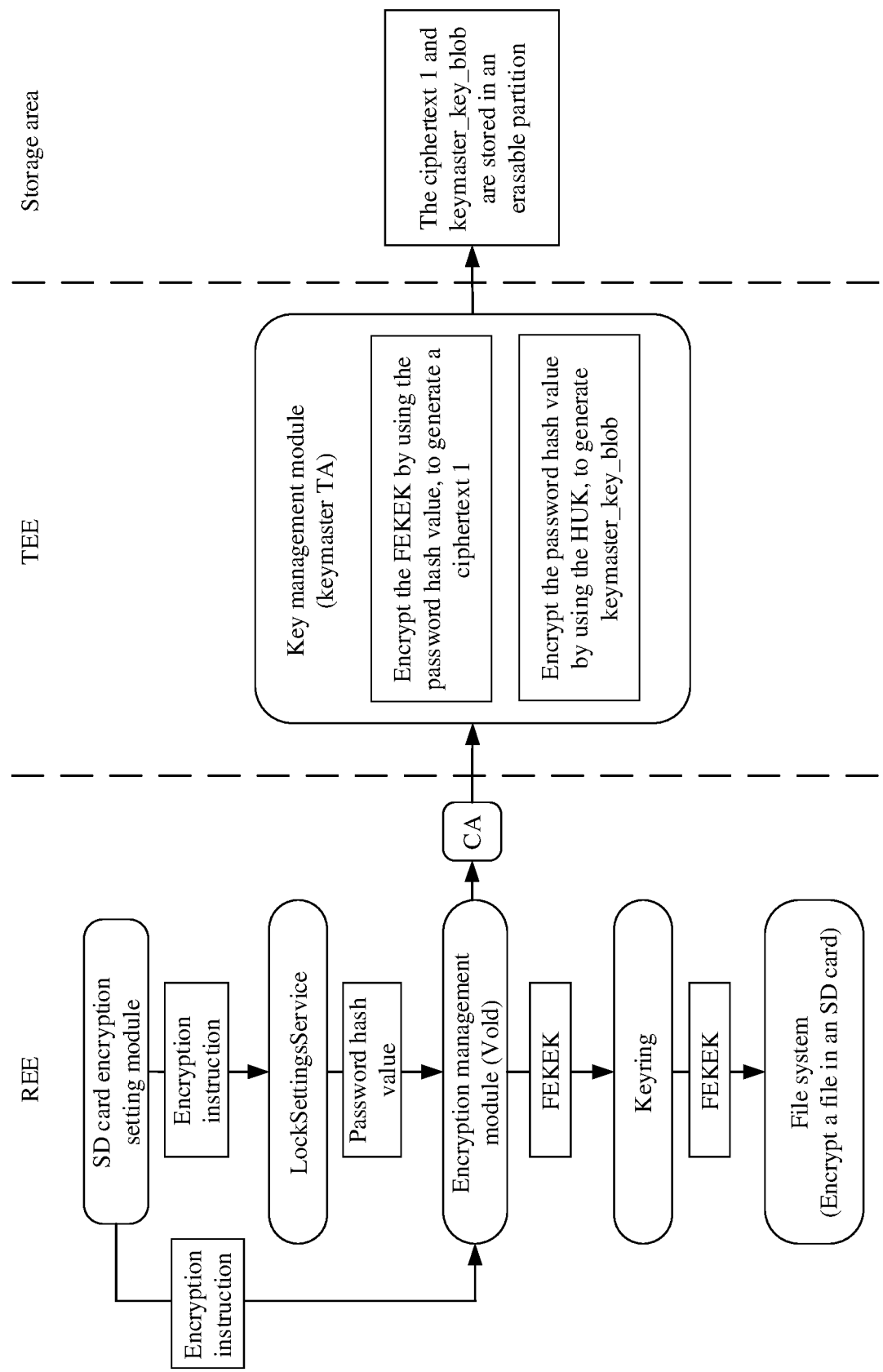
FIG. 6 is a schematic diagram of a method for saving a key according to this application.

After the file in the SD card is encrypted, a file encryption key (file encryption key, FEK) needs to be properly stored. A method for saving an FEK is to encrypt the FEK for a plurality of times and then store the FEK in an erasable partition. The method is shown in FIG. 6.

After the user triggers the encryption process for the SD card on the encryption setting interface shown in FIG. 3, an SD card encryption setting module generates an encryption instruction. Based on a setting condition of a lock screen password, there are two cases for the module invoked by the encryption instruction.

Case 1: The lock screen password is not set.

An SD card encryption module invokes an encryption management module (Vold) by using the encryption instruction to encrypt the FEK. When the user does not set the lock screen password, an empty auth (empty auth) may be subsequently used to encrypt a file encryption key encryption key (file encryption key encryption key, FEKEK). The following describes in detail a process of encrypting the FEK.

Case 2: The lock screen password is set.

The SD card encryption module invokes a LockSettingsService (LockSettingsService) by using the encryption instruction to obtain a password hash value. Subsequently, the LockSettingsService transmits the password hash value to the encryption management module (Vold), so that the password hash value is subsequently used to encrypt the file encryption key encryption key. The password hash value is information generated based on a lock screen password. For example, the LockSettingsService performs a hash calculation on the lock screen password when the user sets the lock screen password to generate a password hash value, obtains a previously saved password hash value after the user triggers encryption of the SD card, and transmits the password hash value to the encryption management module.

The Vold is responsible for implementing core functions of encryption and decryption. The Vold triggers encryption logic or decryption logic for the SD card by invoking an encryption library or a decryption library.

When a file system (such as an eCryptfs) creates a file in an SD card, the file system generates a random number for each file. For example, when the eCryptfs creates a new file, a random function that is provided by the kernel creates a random number. The random number is the FEK. The FEK is used to encrypt the file in the SD card, and is used to decrypt an encrypted file in the SD card.

Optionally, the eCryptfs stores an encrypted file in a file format of an open pretty good privacy (open pretty good privacy, OpenPGP). The encrypted file may be divided into a plurality of logical blocks (extent), and a size of each logical block is adjustable. However, a size of each logical block is usually not greater than a size of a physical page.

After the file in the SD card is encrypted, the FEK needs to be encrypted and saved. When the user sets the SD card encryption, the Vold unmounts and then remounts the file system. In this case, a random number is generated. The random number is the FEKEK (an example of a first key). The FEKEK is used to encrypt the FEK (an example of a second key), where the FEKEK is set by the Vold to a keyring (keyring) of the kernel, and the file system obtains the FEKEK from the keyring when encrypting the FEK. The encrypted FEK is stored in meta data (meta data) of the encrypted file.

After the FEK is encrypted, the FEKEK also needs to be encrypted and saved. Because the Vold is a module in a rich execution environment (rich execution environment, REE), and security does not meet a requirement, the FEKEK cannot be encrypted. The Vold may invoke a key management module in a trusted execution environment (trust execution environment, TEE) by using a client application (client application, CA), that is, a keymaster trusted application (trust application, TA), and the keymaster TA completes encryption on the FEKEK.

The keymaster TA may use the password hash value, and encrypt the FEKEK according to an advanced encryption standard (advanced encryption standard, AES), to generate a ciphertext 1 (an example of a fifth ciphertext). Subsequently, the keymaster TA may use a hardware unique key (hardware unique key, HUK), and encrypt the password hash value according to the AES, to generate keymaster_key_blob (an example of a sixth ciphertext). The keymaster TA stores the ciphertext 1 and keymaster_key_blob in an erasable partition (/data path).

Because HUKs of different apparatuses are unique, password hash values are encrypted by using the HUK, to ensure that the foregoing keymaster_key_blob can only be decrypted on the apparatus 100, so as to ensure the security of the encrypted file in the SD card.

Figure 7:
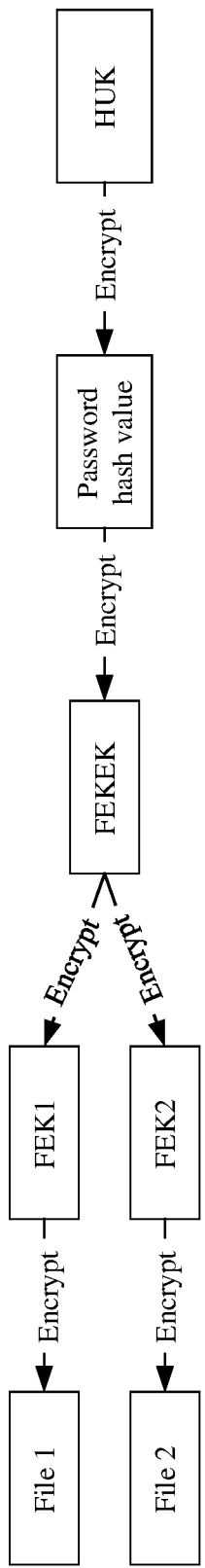
FIG. 7 is a schematic diagram of an encryption procedure according to this application.

An encryption procedure related to FIG. 6 is shown in FIG. 7.

If two to-be-encrypted files (a file 1 and a file 2) exist on a current SD card, the file system generates two random numbers, namely, an FEK1 and an FEK2, for the two files. Subsequently, the file system uses the FEK1 to encrypt the file 1, and uses the FEK2 to encrypt the file 2.

After the file 1 and the file 2 complete encryption, the file system obtains the FEKEK from the keyring, and separately encrypts the FEK1 and the FEK2 by using the FEKEK. The encrypted FEK1 is stored in metadata of the file 1, and the encrypted FEK2 is stored in metadata of the file 2.

Subsequently, the Vold invokes the keymaster TA by using the CA, and the keymaster TA encrypts the FEKEK by using the password hash value. Subsequently, the keymaster TA encrypts the password hash value by using the hardware HUK.

When the encryption file in the SD card needs to be decrypted, the apparatus 100 performs an inverse process of the encryption procedure shown in FIG. 7. For example, the Vold invokes the keymaster TA by using the CA to perform the following decryption step: the keymaster TA obtains keymaster_key_blob and the ciphertext 1 from the erasable partition, first decrypts keymaster_key_blob by using the HUK, to obtain a password hash value, and then decrypts the ciphertext 1 by using the password hash value, to obtain the FEKEK. After obtaining the FEKEK from the keymaster TA, the Vold sets the FEKEK to the keyring. The file system obtains the FEKEK from the keyring, decrypts the FEK, and then decrypts the decrypted file in the SD card by using the FEK.

For example, when the eCryptfs opens an encrypted file, the eCryptfs reads metadata of the header of the encrypted file by using a lower-deck file system, and delivers the metadata to a Keystore module (including a module of the keymaster TA); the Keystore module obtains the FEKEK from the keyring, and decrypts the encrypted FEK in the metadata by using the FEKEK to generate the FEK; and subsequently, the eCryptfs decrypts the encrypted file by using the FEK. When decrypting an encrypted file, each logical block (extent) of the encrypted file is read into a page cache (page cache) and decrypted by using a Kernel Crypto API.

Figure 8:
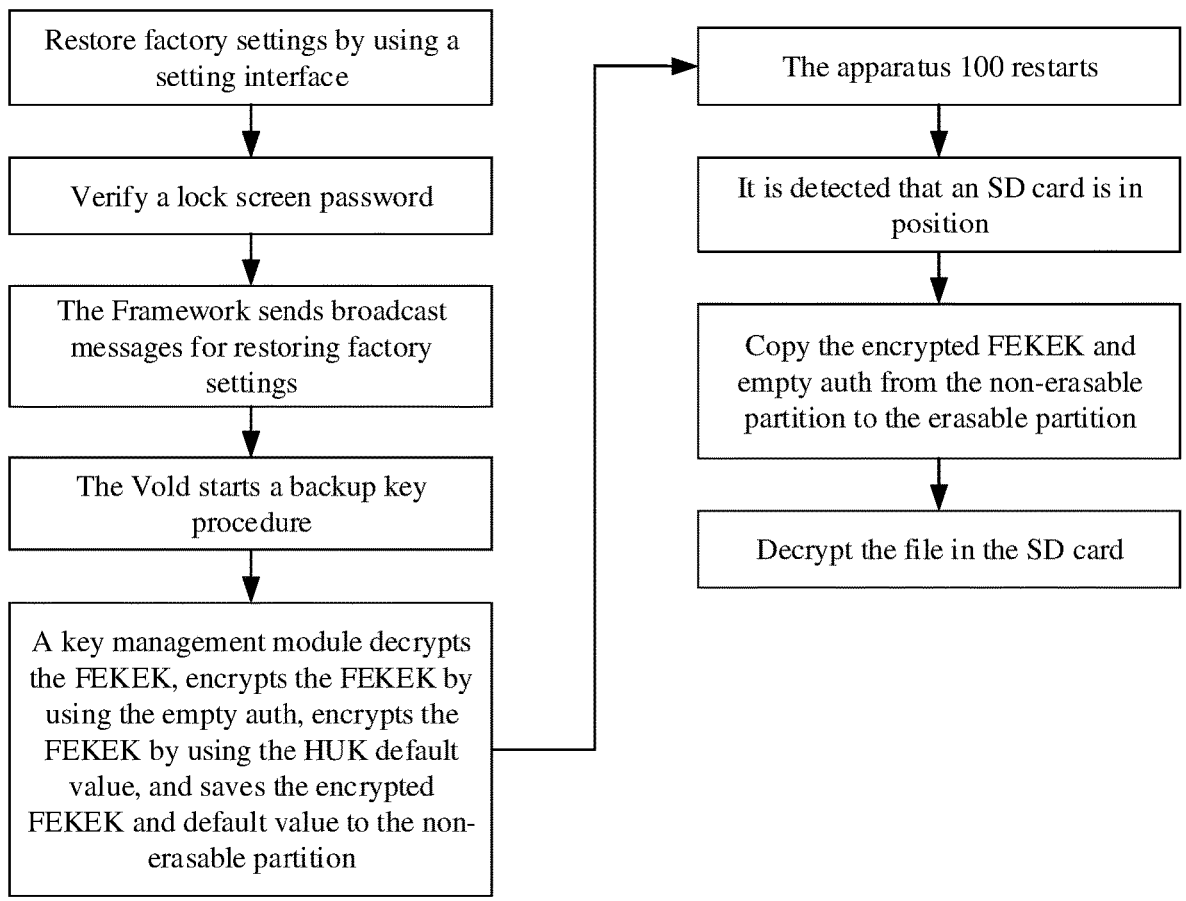
FIG. 8 is a schematic diagram of a method for backing up and recovering a key in a user reset scenario according to this application.

When the apparatus 100 performs a first-type reset (which is also referred to as a "user reset", that is, the user resets the apparatus 100 from a system setting menu), data in the erasable area is cleared. In this case, the apparatus 100 may back up the ciphertext 1 and keymaster_key_blob, so that files in the SD card cannot be decrypted because the ciphertext 1 and keymaster_key_blob are deleted. A backup procedure of a user reset is shown in FIG. 8.

The user controls, by using the setting interface, the apparatus 100 to restore the factory settings. The apparatus 100 verifies the lock screen password that is input by the user. For example, the apparatus 100 performs calculation on the lock screen password that is input by the user to obtain a password hash value, and then compares a password hash value obtained through calculation with a saved password hash value. If two password hash values are the same, it is determined that the two password hash values are verified.

After the verification, the application framework layer (framework) sends a broadcast message for restoring factory settings. After receiving the broadcast message, the Vold starts a backup key procedure, invokes the keymaster TA by using the CA to decrypt the FEKEK from the erasable partition, and then encrypts the FEKEK by using an empty auth (empty auth), and encrypts the empty auth by using the HUK. The encrypted FEKEK and empty auth (an example of a seventh ciphertext and an eighth ciphertext) are saved in the non-erasable partition.

In this application, the non-erasable partition refers to a storage area in which data is not erased during a second-type reset (which is also referred to as a "factory reset", that is, the user does not reset the apparatus 100 by using a system setting menu). The non-erasable partition may be /sec_storage, or may be another secure storage area in a TEE, for example, a replay protected memory block (replay protected memory block, RPMB).

After restoring the factory settings and restarting, the apparatus 100 detects whether the SD card is in position. When the SD is in position, the keymaster TA copies the encrypted FEKEK and empty auth from the non-erasable partition to the erasable partition, so that the encrypted FEKEK and empty auth can be used to restore the FEK and decrypt the file in the SD card.

Figure 9:
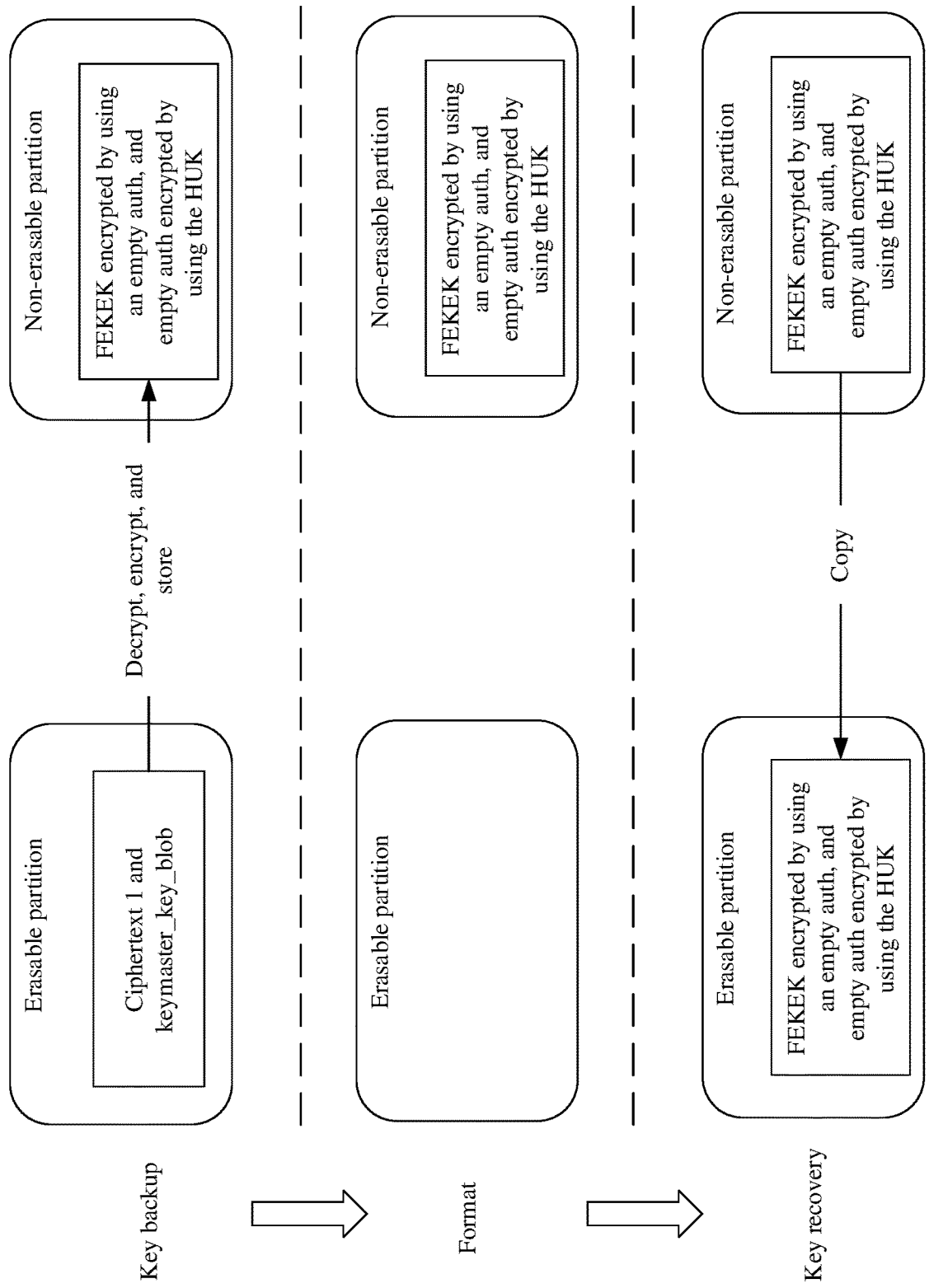
FIG. 9 is a schematic diagram of a ciphertext storage change condition of a storage area in a user reset scenario according to this application.

In conclusion, before and after the apparatus 100 performs the user reset, a key change condition that is stored in the storage area is shown in FIG. 9.

After the user instructs the apparatus 100 to perform the user reset, the apparatus 100 is triggered to perform key backup. In a key backup phase, a ciphertext 1 and keymaster_key_blob are stored in the erasable partition. The ciphertext 1 and keymaster_key_blob are decrypted and encrypted, and are stored in a non-erasable partition in a form of "an FEKEK encrypted by using an empty auth and an empty auth encrypted by using the HUK".

After the key backup is completed, the apparatus 100 enters a formatting phase. In the formatting phase, the data in the erasable partition is cleared, and the data in the non-erasable partition is retained.

After the formatting is completed, the apparatus 100 enters a key recovery phase. In the key recovery phase, the ciphertext in the non-erasable partition (an FEKEK encrypted by using an empty auth and an empty auth encrypted by using the HUK) is copied to the erasable partition, thereby completing key recovery.

In the foregoing user reset process, the user needs to format the apparatus 100 by using a system setting menu. The apparatus 100 has an opportunity to back up a ciphertext (the encrypted FEKEK) in the erasable partition, so that a file in an SD card can still be decrypted after the apparatus 100 is formatted. However, when the user implements a second-type reset (for example, factory reset) on the apparatus 100 without using a system setting menu, the ciphertext in the erasable partition is deleted without being copied to the non-erasable partition, and consequently, the file in the formatted SD card of the apparatus 100 cannot be decrypted.

The following describes another embodiment of a method for saving a ciphertext according to this application, so that a file in an SD card of the apparatus 100 after a factory reset can still be decrypted. This embodiment may be applied to the apparatus 100 together with the foregoing "user reset" embodiment, or may be applied to the apparatus 100 alone.

Figure 10:
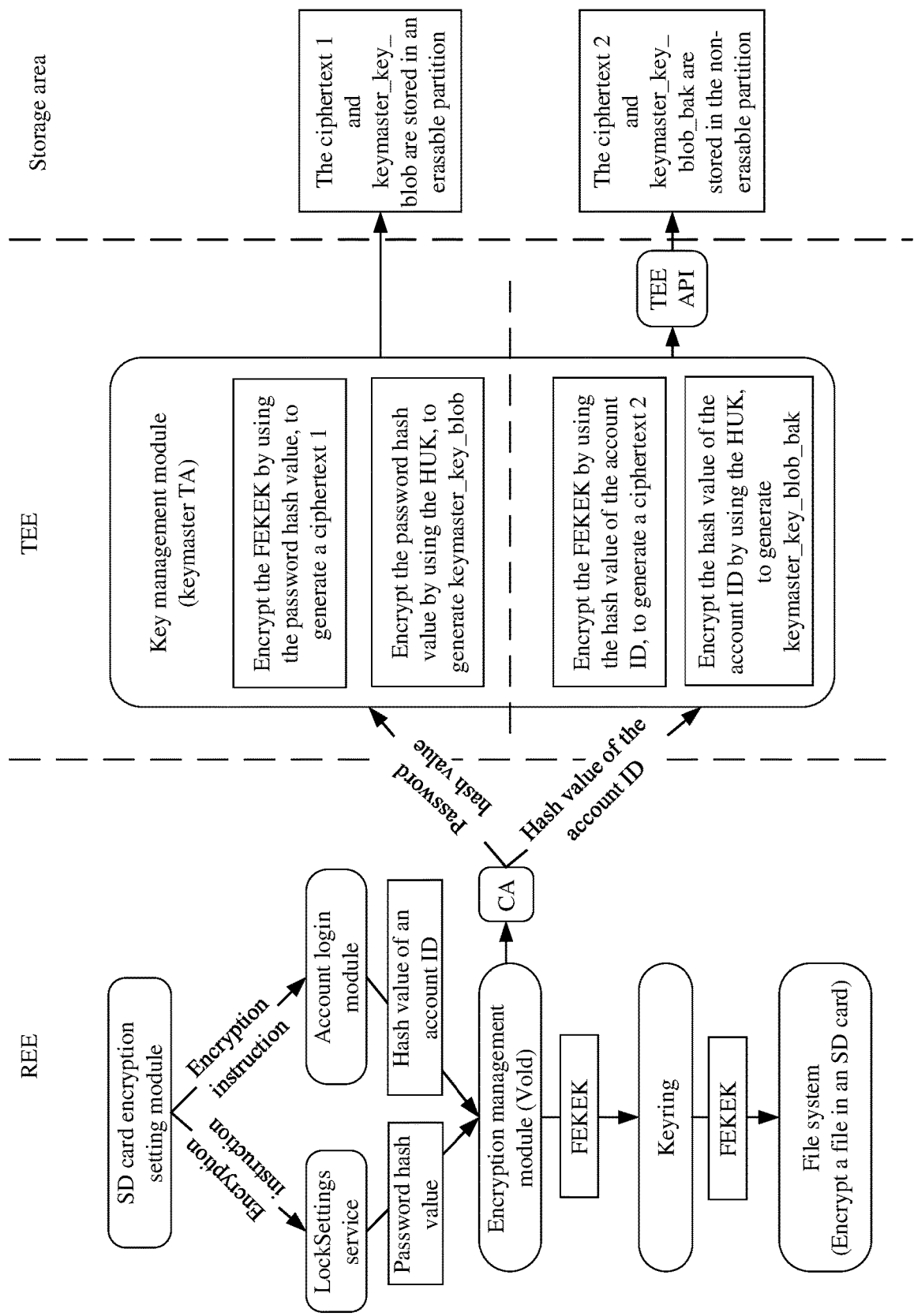
FIG. 10 is a schematic diagram of a method for backing up a key in a factory reset scenario according to this application.

After the user triggers encryption on the SD card on the setting interface shown in FIG. 3, the apparatus 100 performs a key backup procedure shown in FIG. 10. As shown in FIG. 10, an SD card encryption setting module invokes an account login module by using an encryption instruction to perform subsequent processing. Based on the account login condition, there are two processing methods for the account login module:

Case 3: The user does not log in to the account.

Figure 11:
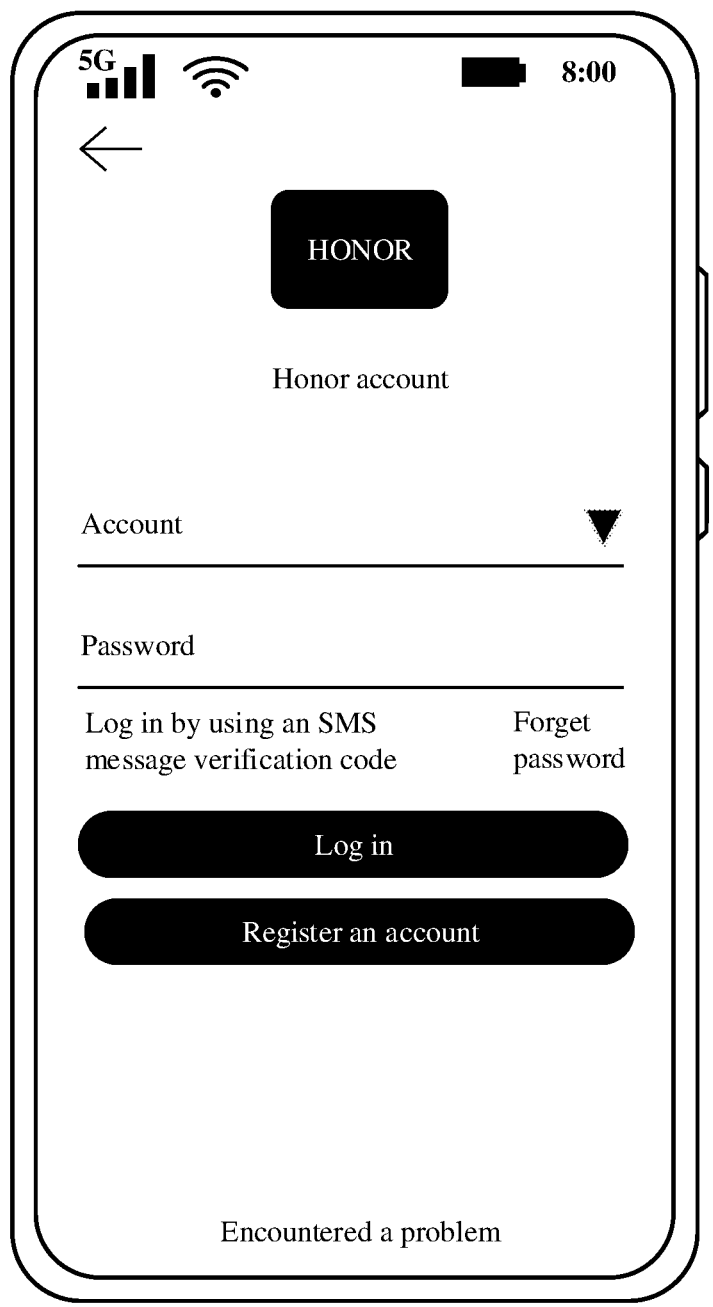
FIG. 11 is a schematic diagram of an account login interface according to this application.

The account login module displays an account login interface as shown in FIG. 11, to prompt the user to log in to the account (for example, an Honor account). After the account is successfully logged in, the account login module calculates a hash value of an account ID (identifier, ID), and subsequently transmits the hash value of the account ID to the Vold.

Case 4: The user has logged in to the account.

The account login module obtains a hash value of the account ID, and transmits the hash value of the account ID to the Vold. Optionally, if the account login module does not calculate the hash value of the account ID before the user triggers the SD card encryption, the account login module calculates the hash value of the account ID when the user triggers the SD card encryption; or if the account login module calculates the hash value of the account ID before the user triggers the SD card encryption, the account login module directly obtains the hash value of the account ID when the user triggers the SD card encryption.

After obtaining the hash value of the account ID, the Vold invokes the keymaster TA by using the CA, and the keymaster TA encrypts and backs up the FEKEK.

The keymaster TA may use the hash value of the account ID, and encrypt the FEKEK according to the AES, to generate a ciphertext 2 (an example of the first ciphertext). Subsequently, the keymaster TA may use the HUK, and encrypt the hash value of the account ID according to the AES, to generate keymaster_key_blob_bak (an example of the second ciphertext). The keymaster TA invokes the TEE API to store the ciphertext 2 and keymaster_key_blob_bak in a non-erasable partition (/sec_storage path), thereby completing backup of the FEKEK.

Because HUKs of different apparatuses are unique, a hash value of an account ID is encrypted by using the HUK, to ensure that the foregoing keymaster_key_blob_bak can only be decrypted on the apparatus 100, so as to ensure the security of the encrypted file in the SD card.

In the method shown in FIG. 10, after the user triggers the encryption on the SD card by using a setting interface, the apparatus 100 may back up the FEKEK at any moment before performing the factory reset. Even if the apparatus 100 subsequently performs the factory reset, the apparatus 100 can restore the FEKEK after a restart, thereby resolving a problem that the file in the SD card cannot be decrypted after the factory reset.

Figure 12:
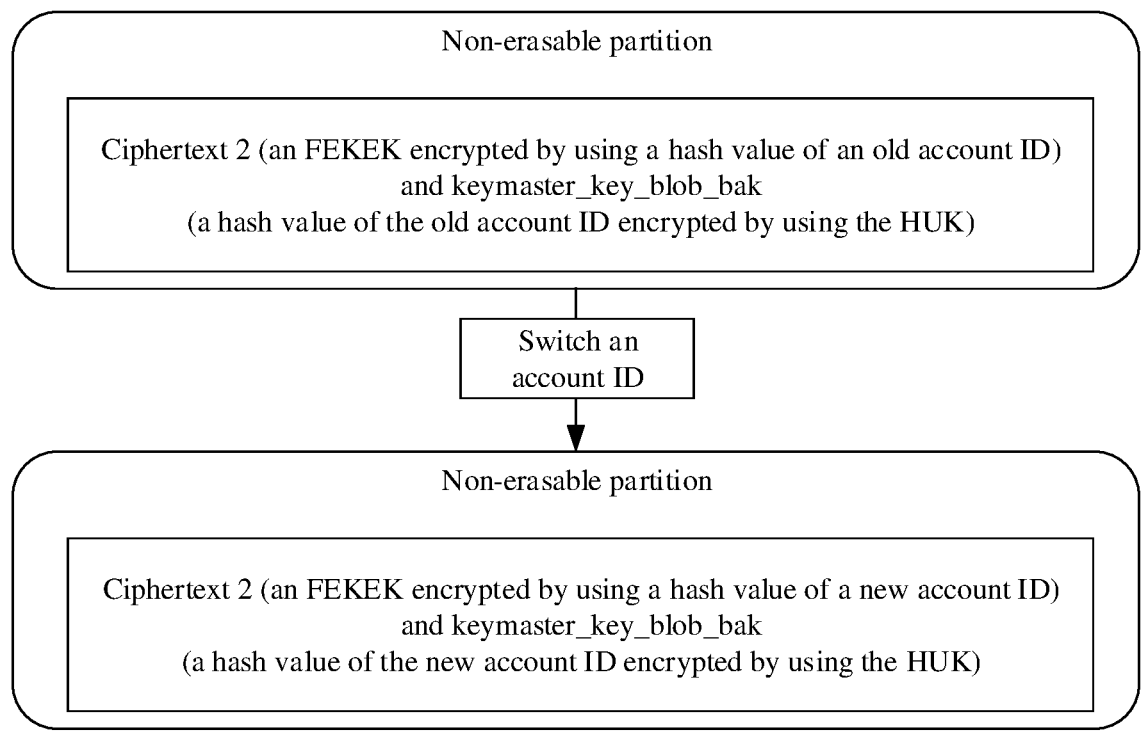
FIG. 12 is a schematic diagram of a ciphertext storage change condition of a storage area existed when switching an account according to this application.

Optionally, after the apparatus 100 performs the method shown in FIG. 10, if the user switches a logged-in account ID, the Vold obtains a hash value of a new account ID, and updates the ciphertext 2 and keymaster_key_blob_bak by using the hash value of the new account ID. An update process is shown in FIG. 12.

The following describes a process in which the apparatus 100 decrypts a file in the SD card after performing a factory reset.

Figure 13:
FIG. 13 is a schematic diagram of a factory reset setting interface according to this application.
Figure 14:
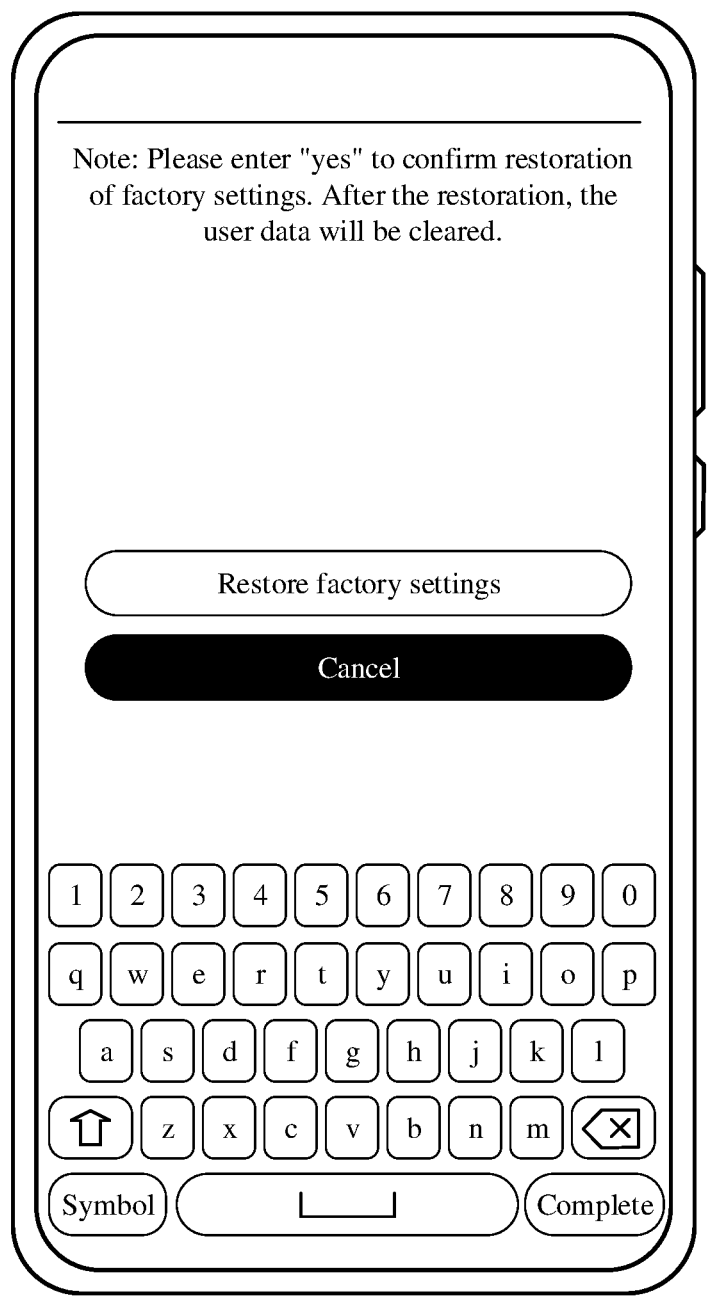
FIG. 14 is a schematic diagram of a factory reset confirmation interface according to this application.
Figure 15:
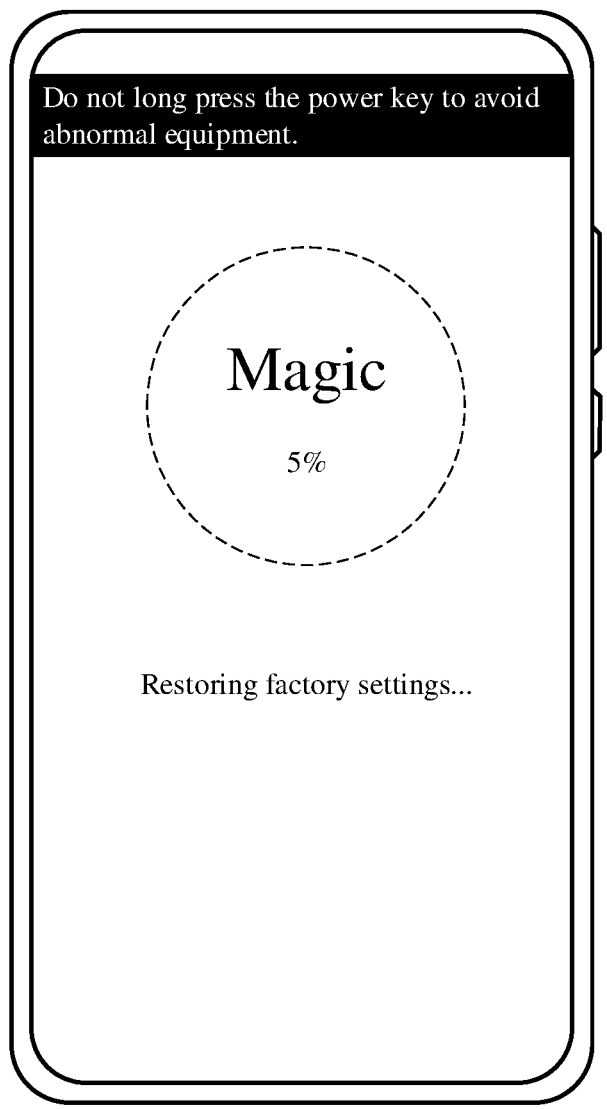
FIG. 15 is a schematic diagram of a factory reset process interface according to this application.

The user first locks screen of (or shuts down) the apparatus 100, and then may press a key combination (for example, "volume key"+"power key") to enable the apparatus 100 to enter a recovery mode and display a factory reset setting interface shown in FIG. 13. Subsequently, the apparatus 100 displays a confirmation interface shown in FIG. 14 after the user taps "restore factory settings". After the user taps "restore factory settings" on the interface shown in FIG. 13, the apparatus 100 performs a factory reset to display a factory reset interface shown in FIG. 15.

Figure 16:
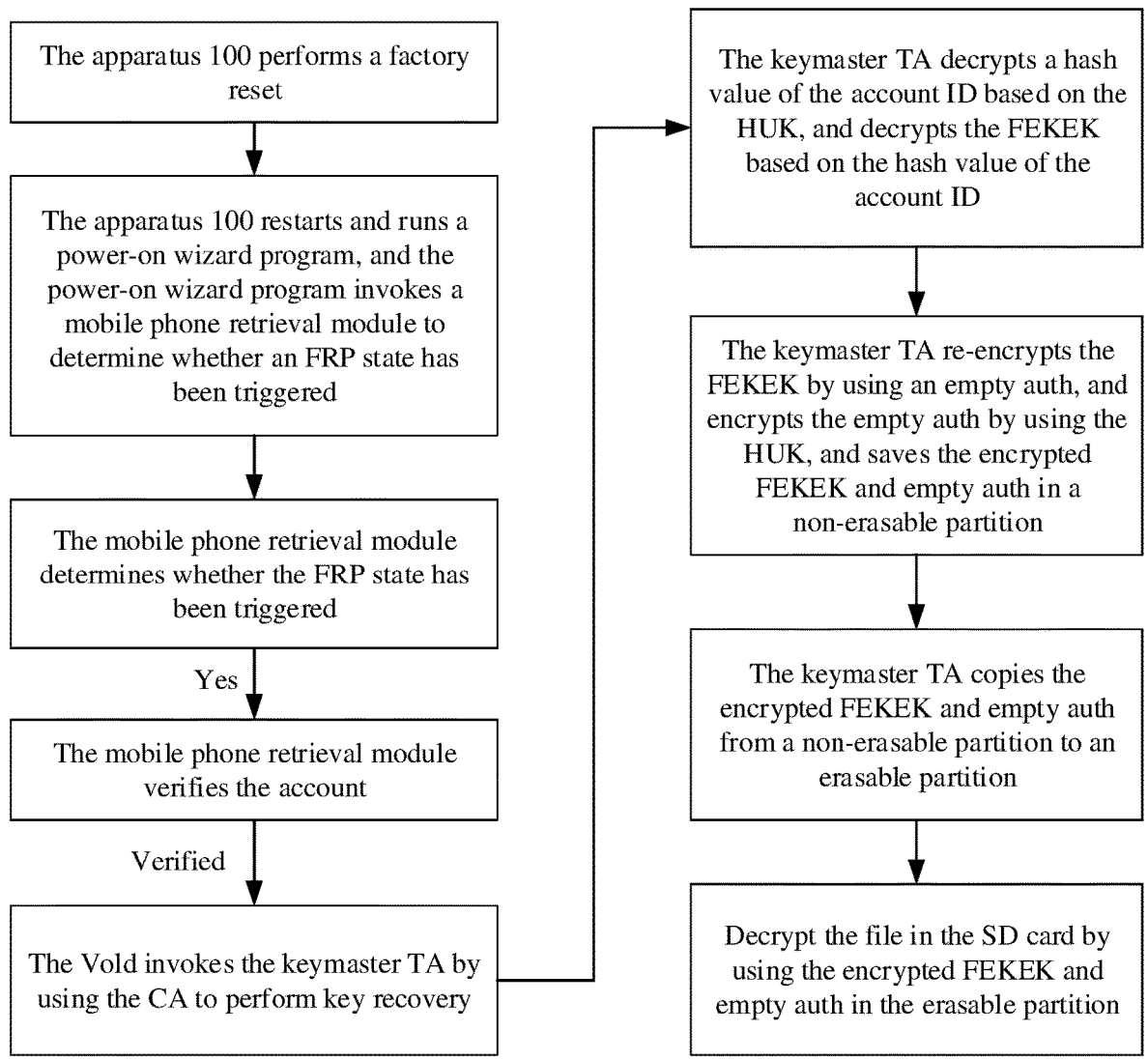
FIG. 16 is a schematic diagram of a recovery key method in a factory reset scenario according to this application.

After completing the factory reset, the apparatus 100 restarts, runs a power-on wizard program, and performs a key recovery procedure shown in FIG. 16.

Figure 17:
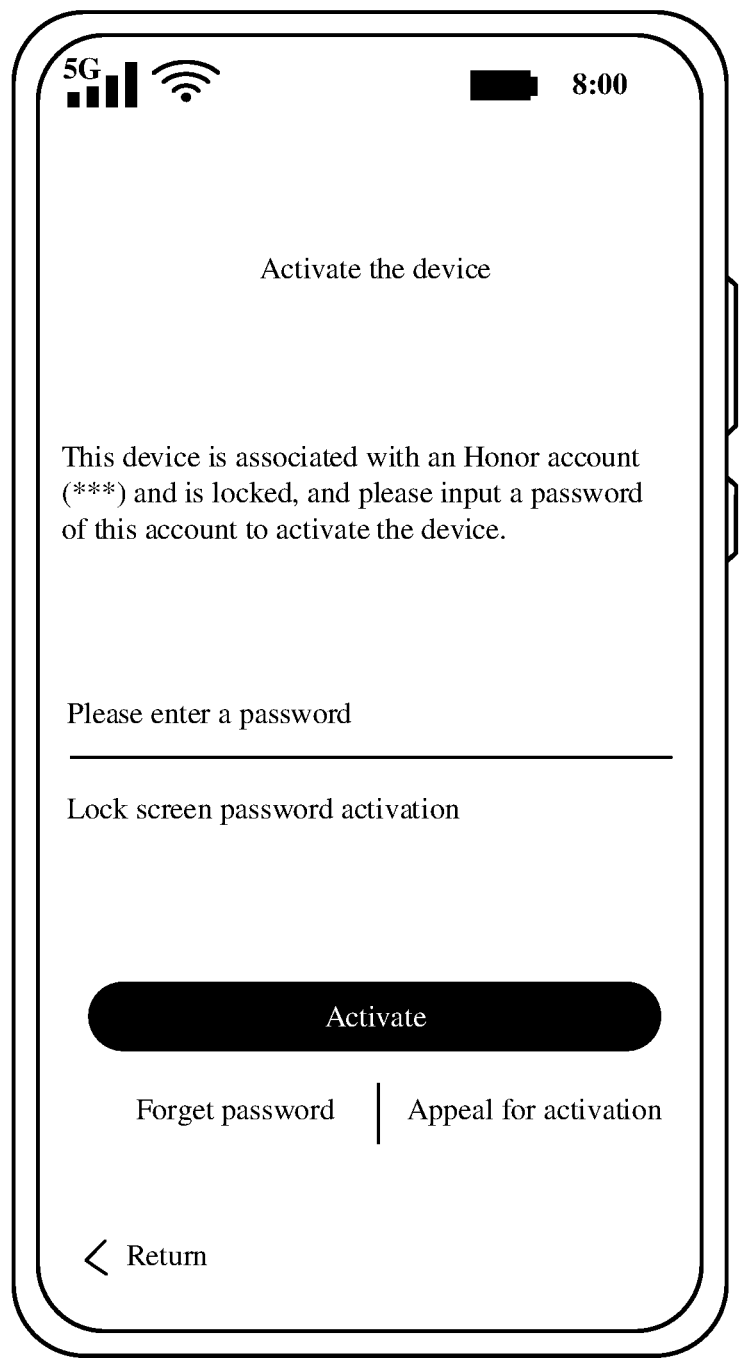
FIG. 17 is a schematic diagram of an account verification interface according to this application.

The power-on wizard program invokes a mobile phone retrieval module to determine whether the factory reset protection (factory reset protection, FRP) state has been triggered. The mobile phone retrieval module invokes, by using the anti-theft CA, an anti-theft TA to determine whether the FRP state has been triggered. If the FRP state has been triggered, the mobile phone retrieval module displays an account verification interface shown in FIG. 17. The account that is verified by the account verification interface is an account associated with the FRP state (that is, a last logged-in account before the apparatus 100 performs the factory reset). After the user inputs a correct password on this interface, the mobile phone retrieval module notifies that the Vold account is verified successfully. Subsequently, the Vold invokes, by using the CA, the keymaster TA to perform the following key recovery steps.

The keymaster TA obtains keymaster_key_blob_bak and the ciphertext 2 from the non-erasable partition, first decrypts keymaster_key_blob_bak by using the HUK, to obtain the hash value of the account ID, and then decrypts the ciphertext 2 by using the hash value of the account ID, to obtain the FEKEK.

The keymaster TA re-encrypts the FEKEK by using an empty auth (empty auth), to generate a third ciphertext, and uses the HUK to encrypt the empty auth to generate a fourth ciphertext. The encrypted FEKEK and empty auth are saved in a non-erasable partition (/sec_storage path) as backup keys. Subsequently, the keymaster TA copies the encrypted FEKEK and empty auth to an erasable partition (/data path), so as to use when encrypting or decrypting the file in the SD card. An old lock screen password is cleared after the apparatus 100 performs the factory reset. In the foregoing embodiment, the apparatus 100 may decrypt the SD card by using an empty auth as a key when 110 new lock screen password is set.

Optionally, the keymaster TA may encrypt the FEKEK without using the empty auth, and directly copy keymaster_key_blob_bak and the ciphertext 2 from the non-erasable partition to the erasable partition. In this case, the apparatus 100 may prompt the user to set a new lock screen password, so as to use the new lock screen password to encrypt the FEKEK.

When the file in the SD card needs to be encrypted, the keymaster TA decrypts the FEKEK from the erasable partition, and transmits the FEKEK to the keyring by using the Vold. After encrypting the file in the SD card by using the FEK, the file system obtains the FEKEK from the keyring, encrypts the FEK by using the FEKEK, and saves the encrypted FEK in the metadata of the file.

When the file in the SD card needs to be decrypted, the keymaster TA decrypts the FEKEK from the erasable partition, and transmits the FEKEK to the keyring by using the Vold. The file system decrypts the FEK from the metadata of the file of the SD card by using the FEKEK, and then decrypts the file by using the FEK.

Figure 18:
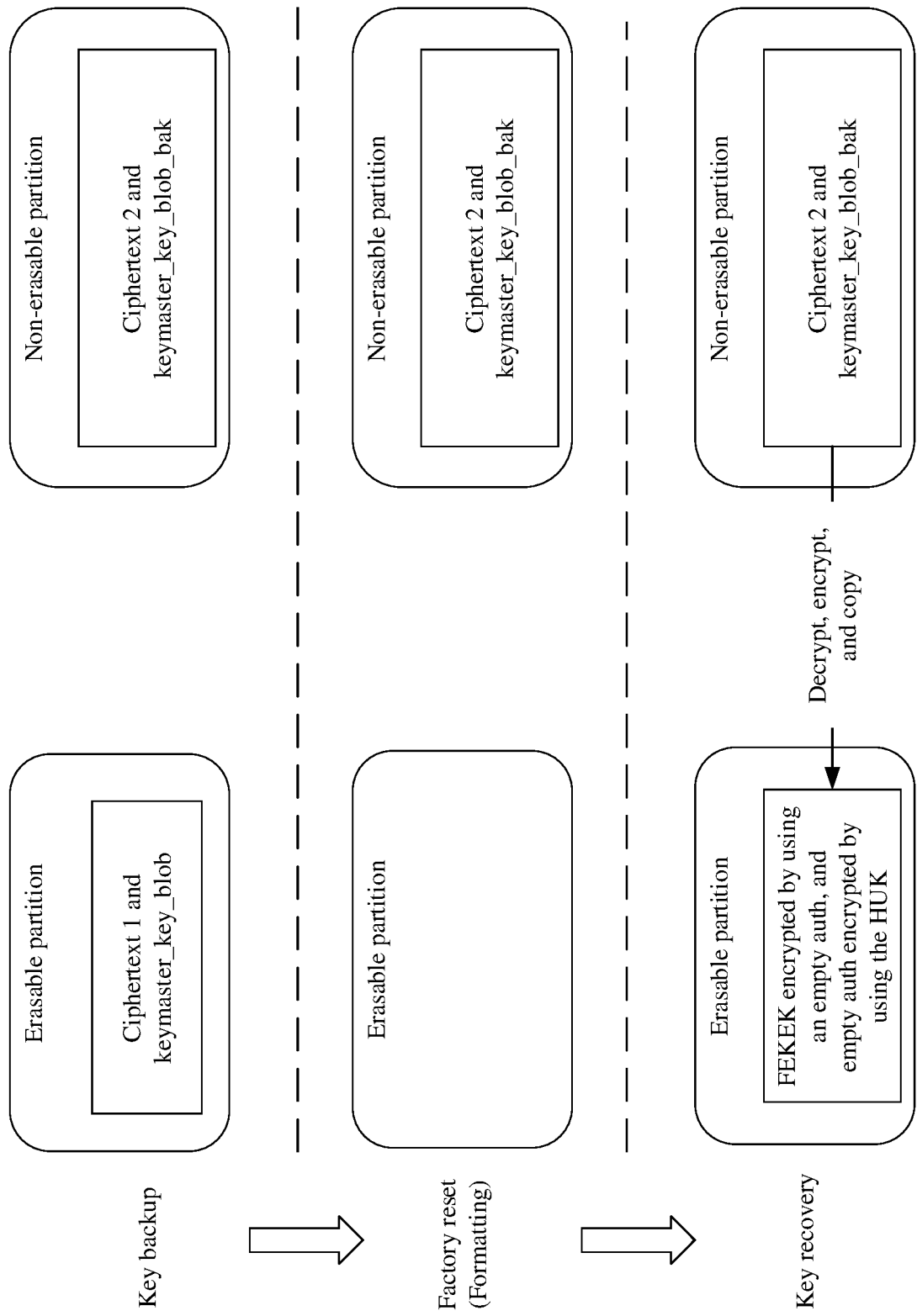
FIG. 18 is a schematic diagram of a ciphertext storage change condition of a storage area in a factory reset scenario according to this application.

In conclusion, before and after the apparatus 100 performs the factory reset, a key change condition that is stored in the storage area is shown in FIG. 18.

When the user instructs apparatus 100 to encrypt the file in the SD card, the apparatus 100 is triggered to perform key backup. In a key backup phase, the erasable partition stores a ciphertext 1 and keymaster_key_blob, and the non-erasable partition stores a ciphertext 2 and keymaster_key_blob_bak. The ciphertext 1 is an FEKEK encrypted by using a password hash value, keymaster_key_blob is a password hash value that is encrypted by using a HUK, the ciphertext 2 is an FEKEK encrypted by using a hash value of an account ID, and keymaster_key_blob_bak is a hash value of an account ID that is encrypted by using the HUK.

After the user instructs the apparatus 100 to perform a factory reset, the apparatus 100 enters a factory reset phase, and performs formatting. In the factory reset phase, the data in the erasable partition is cleared, and the data in the non-erasable partition is retained.

After the formatting is completed, the apparatus 100 enters a key recovery phase. In the key recovery phase, the ciphertext (the ciphertext 2 and keymaster_key_blob_bak) in a non-erasable partition is decrypted, encrypted, and copied to an erasable partition in a form of "an FEKEK encrypted by using an empty auth and an empty auth encrypted by using a HUK", thereby completing key recovery.

The foregoing has described in detail an example of a method for saving a ciphertext according to this application. It may be understood that, to implement the foregoing functions, the corresponding apparatus includes a corresponding hardware structure and/or a software module that performs each function. A person skilled in the art should easily realize that, with reference to the examples described in embodiments disclosed in this specification, units and algorithm steps can be implemented in a form of hardware or a combination of hardware and computer software in this application. Whether a function is implemented in a manner of hardware or hardware driven by computer software depends on a specific application and a design constraint of a technical solution. A person skilled in the art may use different methods to implement the described functions for each specific application, but such implementation should not be considered to be beyond the scope of this application.

In this application, the apparatus for saving the ciphertext may be divided into function units based on the foregoing method examples. For example, each function unit may be obtained through division based on a corresponding function, or two or more functions may be integrated into one unit. The foregoing integrated unit may be implemented in a form of hardware, or may be implemented in a form of a software function unit. It should be noted that the unit division in this application is an example and is merely logical function division, and there may be another division manner during actual implementation.

Figure 19:
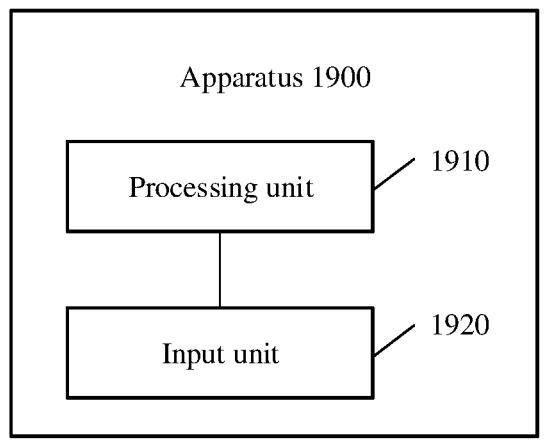
FIG. 19 is a schematic diagram of an apparatus for saving a ciphertext according to this application.

FIG. 19 is a schematic diagram of a structure of an apparatus for saving a ciphertext according to this application. The apparatus 1900 includes a processing unit 1910 and an input unit 1920.

The input unit 1920 is configured to obtain an encryption instruction, where the encryption instruction instructs to encrypt a file in an external memory.

The processing unit 1910 is configured to: obtain an eigenvalue of a first account identifier based on the encryption instruction; encrypt a first key by using the eigenvalue of the first account identifier to generate a first ciphertext, where the first key is used to encrypt a second key, and the second key is used to encrypt a first file in the external memory; encrypt the eigenvalue of the first account identifier to generate a second ciphertext; and store the first ciphertext and the second ciphertext in a non-erasable partition.

Optionally, the input unit 1920 is further configured to obtain indication information for switching an account.

The processing unit 1910 is further configured to: verify the first account identifier based on the indication information; obtain an eigenvalue of a second account identifier after the first account identifier is verified; and update the first ciphertext and the second ciphertext based on the eigenvalue of the second account identifier.

Optionally, the processing unit 1910 is further configured to determine whether FRP state is triggered; verify the first account identifier when the FRP state has been triggered; and when the first account identifier is verified successfully, decrypt the first ciphertext and the second ciphertext to generate the first key.

Optionally, the processing unit 1910 is further configured to: encrypt the first key by using an empty auth to generate a third ciphertext; encrypt the empty auth to generate a fourth ciphertext; and store the third ciphertext and the fourth ciphertext in the non-erasable partition.

Optionally, the processing unit 1910 is further configured to: copy the third ciphertext and the fourth ciphertext from the non-erasable partition to an erasable partition; generate the first key based on the third ciphertext and the fourth ciphertext in the erasable partition; and decrypt the file in the external memory based on the first key.

For a specific manner in which the apparatus 1900 performs the method for saving the ciphertext and a beneficial effect produced, refer to related descriptions in the method embodiments.

Figure 20:
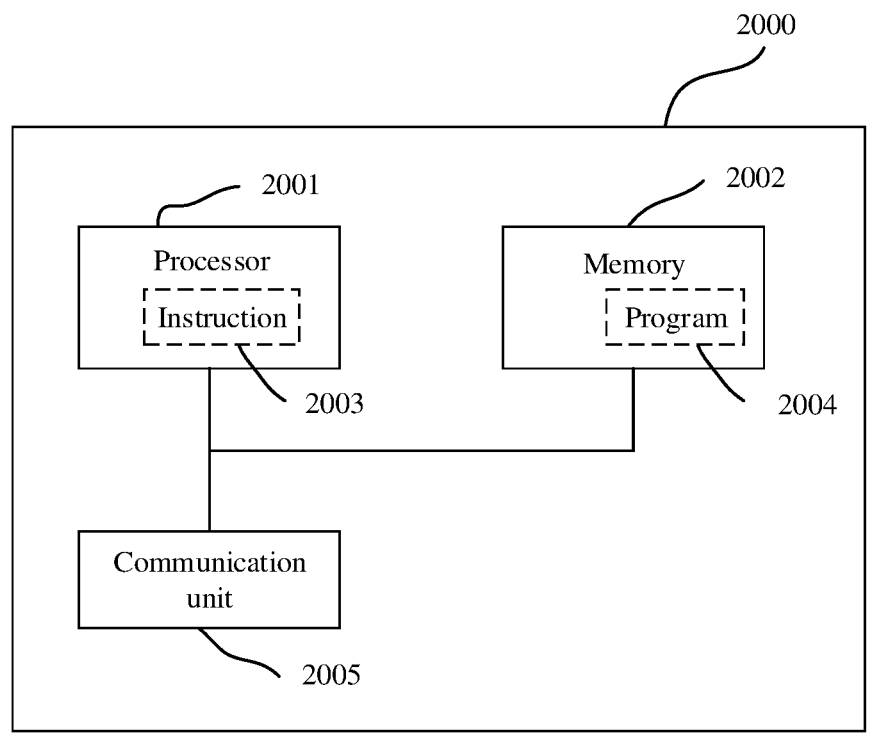
FIG. 20 is a schematic diagram of an electronic device for saving a ciphertext according to this application.

FIG. 20 is a schematic diagram of a structure of an electronic device according to this application. The dashed line in FIG. 20 indicates that the unit or the module is optional. The device 2000 may be configured to implement the method described in the foregoing method embodiments.

The device 2000 includes one or more processors 2001. The one or more processors 2001 may support the device 2000 to implement the method in the method embodiments. The processor 2001 may be a general-purpose processor or a special-purpose processor. For example, the processor 2001 may be a central processing unit (central processing unit, CPU), a digital signal processor (digital signal processor, DSP), an application specific integrated circuit (application specific integrated circuit, ASIC), a field programmable gate array (field programmable gate array, FPGA), or another programmable logic device such as a discrete gate, a transistor logic device, or a discrete hardware component.

The processor 2001 may be configured to control the device 2000, execute a software program, and process data of the software program. The device 2000 may further include a communication unit 2005, which may be configured to implement input (receiving) and output (transmission) of a signal.

For example, the device 2000 may be a chip, the communication unit 2005 may be an input circuit and/or an output circuit of the chip, or the communication unit 2005 may be a communication interface of the chip, and the chip may be used as an integral part of a terminal device or another electronic device.

For another example, the device 2000 may be a terminal device, and the communication unit 2005 may be a transceiver of the terminal device, or the communication unit 2005 may be a transceiver circuit of the terminal device.

The device 2000 may include one or more memories 2002. A program 2004 is stored in the memory 2002. The program 2004 may be run by the processor 2001 to generate an instruction 2003, to enable the processor 2001 to perform, based on the instruction 2003, the method described in the foregoing method embodiments. Optionally, the memory 2002 may further store data. Optionally, the processor 2001 may further read data (for example, a first ciphertext and a second ciphertext) stored in the memory 2002, where the data may be stored in a same storage address as the program 2004, or the data may be stored in different storage addresses as the program 2004.

The processor 2001 and the memory 2002 may be disposed separately, or may be integrated together, for example, integrated into a system on chip (system on chip, SOC) of the terminal device.

This application further provides a computer program product. When the computer program product is executed by the processor 2001, the method according to any method embodiment in this application is implemented.

The computer program product may be stored in the memory 2002, for example, may be the program 2004, and the program 2004 is finally converted into an executable target file that can be executed by the processor 2001 after a processing process such as preprocessing, compilation, assembly, and linking.

This application further provides a computer-readable storage medium. The computer-readable storage medium stores a computer program. When the computer program is executed by a computer, the method according to any method embodiment in this application is implemented. The computer program may be a high-level language program, or may be an executable target program.

For example, the computer-readable storage medium is the memory 2002. The memory 2002 may be a volatile memory or a nonvolatile memory, or the memory 2002 may include both a volatile memory and a nonvolatile memory. The nonvolatile memory may be a read-only memory (read-only memory, ROM), a programmable ROM (programmable ROM, PROM), an erasable PROM (erasable PROM, EPROM), an electrically EPROM (electrically EPROM, EEPROM), or a flash memory. The volatile memory may be a random access memory (random access memory, RAM), and is used as an external cache. For example but not for limitation, many forms of RAMs are available, such as a static RAM (static RAM, SRAM), a dynamic RAM (dynamic RAM, DRAM), a synchronous DRAM (synchronous DRAM, SDRAM), a double data rate SDRAM (double data rate SDRAM, DDR SDRAM), an enhanced SDRAM (enhanced SDRAM, ESDRAM), a synchlink DRAM (synchlink DRAM, SLDRAM), and a direct rambus RAM (direct rambus RAM, DR RAM).

It may be clearly understood by a person skilled in the art that, for convenience and brevity of description, for a detailed working process and a technical effect of the foregoing described apparatus and device, reference may be made to a corresponding process and technical effect in the foregoing method embodiments, and details are not described herein again.

In the several embodiments provided in this application, the disclosed system, apparatus, and method may be implemented in other manners. For example, some features of the method embodiments described above may be ignored or not performed. The described apparatus embodiment is merely an example. Division into the units is merely logical function division and may be other division in actual implementation. A plurality of units or components may be combined or integrated into another system. In addition, couplings between units or couplings between components may be direct couplings, or may be indirect couplings. The couplings includes connections in electronic, mechanical, or another form.

It should be understood that, in various embodiments of this application, sequence numbers of the foregoing processes do not mean execution sequences. The execution sequences of the processes should be determined based on functions and internal logic of the processes, and should not be construed as any limitation on the implementation processes of the embodiments of this application.

In addition, the terms "system" and "network" in this specification are often used interchangeably in this specification. In this specification, the term "and/or" is only used to describe an association relationship between associated objects, and indicates that three relationships may exist. For example, A and/or B may indicate the following: Only A exists, both A and B exist, and only B exists. In addition, the character "/" in this specification usually indicates an "or" relationship between the associated objects.

In conclusion, the foregoing descriptions are merely preferred embodiments of the technical solutions of this application, and are not intended to limit the protection scope of this application. Any modifications, equivalents, modifications, or the like made within the spirit and principles of this application shall fall within the protection scope of this application.

What is claimed is:

1. A chip, comprising:
   at least one processor; and
   at least one non-transitory storage medium coupled to the at least one processor, the at least one non-transitory storage medium storing instructions that, when executed by the at least one processor, cause the chip to perform the following:
      displaying an encryption setting interface of an external memory;
      receiving a first operation that is performed by a user on the encryption setting interface;
      encrypting a file in the external memory in response to the first operation;
      receiving a second operation of the user;
      displaying a factory reset setting interface in response to the second operation;
      receiving a third operation that is performed by the user on the factory reset setting interface;
      performing a factory reset in response to the third operation;
      displaying an account verification interface;
      receiving verification information that is input by the user on the account verification interface; and
      when the verification information is verified, and when an operation in which the user accesses the file in the external memory is received, decrypting the file that is encrypted in the external memory;
   wherein receiving the first operation that is performed by the user on the encryption setting interface comprises:
      obtaining an encryption instruction, wherein the encryption instruction instructs to encrypt the file in the external memory; and
   wherein the instructions, when executed by the at least one processor, cause the chip to further perform:
      obtaining an eigenvalue of a first account identifier based on the encryption instruction;
      encrypting a first key by using the eigenvalue of the first account identifier to generate a first ciphertext, wherein the first key is used to encrypt a second key, and the second key is used to encrypt the file in the external memory;

encrypting the eigenvalue of the first account identifier to generate a second ciphertext; and storing the first ciphertext and the second ciphertext in a non-erasable partition.

2. The chip according to claim 1, wherein when the at least one processor executes the instructions, the chip is caused to further perform the following steps:

receiving a fourth operation that is performed by the user on the encryption setting interface;

encrypting the file in the external memory in response to the fourth operation;

receiving a fifth operation of the user;

displaying a user reset setting interface in response to the fifth operation;

receiving a sixth operation that is performed by the user on the user reset setting interface;

performing a user reset in response to the sixth operation;

displaying a lock screen password verification interface;

receiving a lock screen password that is input by the user on the lock screen password verification interface; and when the lock screen password is verified, and when an operation in which the user accesses the file in the external memory is received, decrypting the file that is encrypted in the external memory.

3. The chip according to claim 1 wherein when the at least one processor executes the instructions, the chip is caused to further perform the following steps:

obtaining indication information for switching an account;

verifying the first account identifier based on the indication information;

obtaining an eigenvalue of a second account identifier after the first account identifier is verified; and updating the first ciphertext and the second ciphertext based on the eigenvalue of the second account identifier.

4. The chip according to claim 1 wherein before the decrypting the encrypted file in the external memory, when the at least one processor executes the instructions, the chip is caused to further perform the following steps:

verifying the first account identifier based on the verification information after the factory reset is completed; and when the first account identifier is verified successfully, decrypting the first ciphertext and the second ciphertext to generate the first key.

5. The chip according to claim 4, wherein the verifying the first account identifier based on the verification information comprises:

verifying the first account identifier based on the verification information, when a factory reset protection (FRP) state has been triggered.

6. The chip according to claim 4, wherein when the at least one processor executes the instructions, the chip is caused to further perform the following steps:

encrypting the first key by using an empty auth to generate a third ciphertext;

encrypting the empty auth to generate a fourth ciphertext; and storing the third ciphertext and the fourth ciphertext in the non-erasable partition.

7. The chip according to claim 6, wherein when the at least one processor executes the instructions, the chip is caused to further perform the following steps:

copying the third ciphertext and the fourth ciphertext from the non-erasable partition to an erasable partition;

generating the first key based on the third ciphertext and the fourth ciphertext in the erasable partition; and decrypting, based on the first key, the first file that is encrypted in the external memory.

8. The chip according to claim 1 wherein the performing a factory reset in response to the third operation comprises:

obtaining a factory reset instruction that is triggered by the third operation on the factory reset setting interface; and formatting data in the erasable partition based on the factory reset instruction.

9. The chip according to claim 1 wherein the encrypting a first key by using the eigenvalue of the first account identifier comprises:

invoking a key management module to encrypt the first key by using the eigenvalue of the first account identifier; and wherein the encrypting the eigenvalue of the first account identifier comprises:

invoking the key management module to encrypt the eigenvalue of the first account identifier.

10. The chip according to claim 1 wherein the storing the first ciphertext and the second ciphertext in a non-erasable partition comprises:

invoking a trusted execution environment application programming interface to store the first ciphertext and the second ciphertext in the non-erasable partition.

11. The chip according to claim 1 wherein the first key is further used to encrypt a third key, and the third key is used to encrypt a second file that is encrypted in the external memory.

12. The chip according to claim 1 wherein when the at least one processor executes the instructions, the chip is caused to further perform the following steps:

obtaining an eigenvalue of a lock screen password based on the encryption instruction;

encrypting the first key by using the eigenvalue of the lock screen password to generate a fifth ciphertext;

encrypting the eigenvalue of the lock screen password to generate a sixth ciphertext; and storing the fifth ciphertext and the sixth ciphertext in the erasable partition;

wherein the encrypting the first key by using the eigenvalue of the lock screen password comprises:

invoking a key management module to encrypt the first key by using the eigenvalue of the lock screen password; and wherein the encrypting the eigenvalue of the lock screen password comprises:

invoking the key management module to encrypt the eigenvalue of the lock screen password.

13. The chip according to claim 12, wherein when the at least one processor executes the instructions, the chip is caused to further perform the following steps:

obtaining a user reset instruction that is triggered by a setting interface; and backing up the fifth ciphertext and the sixth ciphertext to the non-erasable partition based on the user reset instruction.

14. The chip according to claim 13, wherein the backing up the fifth ciphertext and the sixth ciphertext to the non-erasable partition based on the user reset instruction comprises:

decrypting the first key from the fifth ciphertext and the sixth ciphertext based on the user reset instruction;

encrypting the first key by using an empty auth to generate a seventh ciphertext;

encrypting the empty auth to generate an eighth ciphertext; and storing the seventh ciphertext and the eighth ciphertext in the non-erasable partition.

15. The chip according to claim 14, wherein when the at least one processor executes the instructions, the chip is caused to further perform the following steps:

copying the seventh ciphertext and the eighth ciphertext from the non-erasable partition to the erasable partition after a user reset is completed;

decrypting the first key from the seventh ciphertext and the eighth ciphertext in the erasable partition; and decrypting, based on the first key, the first file that is encrypted in the external memory.

16. The chip according to claim 12, wherein the erasable partition is a data partition, and the eigenvalue of the lock screen password is a hash value of the lock screen password.

17. The chip according to claim 1 wherein the non-erasable partition is a secure storage partition, and the eigenvalue of the first account identifier is a hash value of the first account identifier.

18. A method for saving a ciphertext, comprising:

displaying an encryption setting interface of an external memory;

receiving a first operation that is performed by a user on the encryption setting interface;

encrypting a file in the external memory in response to the first operation, wherein encrypting the file in the external memory comprises:

obtaining an encryption instruction, wherein the encryption instruction instructs to encrypt the file in the external memory;

obtaining an eigenvalue of a first account identifier based on the encryption instruction;

encrypting a first key by using the eigenvalue of the first account identifier to generate a first ciphertext, wherein the first key is used to encrypt a second key, and the second key is used to encrypt the file in the external memory;

encrypting the eigenvalue of the first account identifier to generate a second ciphertext; and storing the first ciphertext and the second ciphertext in a non-erasable partition;

receiving a second operation of the user;

displaying a factory reset setting interface in response to the second operation;

receiving a third operation that is performed by the user on the factory reset setting interface;

performing a factory reset in response to the third operation;

displaying an account verification interface;

receiving verification information that is input by the user on the account verification interface; and when the verification information is verified, and when an operation in which the user accesses the file in the external memory is received, decrypting the file that is encrypted in the external memory.

19. The method according to claim 18, wherein:

the displaying an account verification interface comprises displaying the account verification interface when a factory reset protection (FRP) state has been triggered; and the method further comprises, after the verification information is verified:

encrypting the first key by using an empty auth to generate a third ciphertext;

encrypting the empty auth to generate a fourth ciphertext; and storing the third ciphertext and the fourth ciphertext in the non-erasable partition.

20. A non-transitory computer-readable storage medium, wherein the non-transitory computer-readable storage medium stores a computer program, and when the computer program is executed by a processor, the processor is enabled to perform operations comprising:

displaying an encryption setting interface of an external memory;

receiving a first operation that is performed by a user on the encryption setting interface;

encrypting a file in the external memory in response to the first operation, wherein encrypting the file in the external memory comprises:

obtaining an encryption instruction, wherein the encryption instruction instructs to encrypt the file in the external memory;

obtaining an eigenvalue of a first account identifier based on the encryption instruction;

encrypting a first key by using the eigenvalue of the first account identifier to generate a first ciphertext, wherein the first key is used to encrypt a second key, and the second key is used to encrypt the file in the external memory;

encrypting the eigenvalue of the first account identifier to generate a second ciphertext; and storing the first ciphertext and the second ciphertext in a non-erasable partition;

receiving a second operation of the user;

displaying a factory reset setting interface in response to the second operation;

receiving a third operation that is performed by the user on the factory reset setting interface;

performing a factory reset in response to the third operation;

displaying an account verification interface;

receiving verification information that is input by the user on the account verification interface; and when the verification information is verified, and when an operation in which the user accesses the file in the external memory is received, decrypting the file that is encrypted in the external memory.

* * * * *